(12) United States Patent
Schierbaum

(10) Patent No.: US 10,336,235 B2
(45) Date of Patent: Jul. 2, 2019

(54) METHOD AND APPARATUS FOR LOWERING ENTIRE BOAT TRAILER IN SHALLOW WATER TO LAUNCH BOAT OR OTHER WATERCRAFT

(71) Applicant: Ronald D. Schierbaum, Bluford, IL (US)

(72) Inventor: Ronald D. Schierbaum, Bluford, IL (US)

( * ) Notice: Subject to any disclaimer, the term of this patent is extended or adjusted under 35 U.S.C. 154(b) by 160 days.

(21) Appl. No.: 15/704,737

(22) Filed: Sep. 14, 2017

(65) Prior Publication Data
US 2018/0126893 A1 May 10, 2018

Related U.S. Application Data

(60) Provisional application No. 62/394,967, filed on Sep. 15, 2016.

(51) Int. Cl.
*B60P 3/10* (2006.01)
*B60P 1/02* (2006.01)

(52) U.S. Cl.
CPC .......... *B60P 3/1066* (2013.01); *B60P 3/1033* (2013.01); *B60P 1/027* (2013.01)

(58) Field of Classification Search
CPC .............................. B60P 3/1066; B60P 3/1033
See application file for complete search history.

(56) References Cited

U.S. PATENT DOCUMENTS

| | | | |
|---|---|---|---|
| 2,740,639 A * | 4/1956 | Eckroad | B60P 3/1033 280/405.1 |
| 2,788,908 A | 4/1957 | Lynd | |
| 2,835,399 A | 5/1958 | Buchholz | |
| 2,835,400 A | 5/1958 | Latzke | |
| 2,937,775 A | 5/1960 | Funk, Jr. | |
| 3,032,218 A | 5/1962 | Grigonis | |
| 3,494,630 A * | 2/1970 | Smith | B60P 3/1033 280/414.1 |
| 3,768,677 A * | 10/1973 | Moss | B60P 3/1033 280/414.1 |
| 3,812,988 A | 5/1974 | Pyle | |
| 3,856,319 A | 12/1974 | Hardy | |
| 4,319,862 A * | 3/1982 | Cook | B60P 3/1058 280/414.1 |
| 5,292,145 A | 3/1994 | Ostrand | |

* cited by examiner

*Primary Examiner* — Kevin Hurley
*Assistant Examiner* — Michael R Stabley
(74) *Attorney, Agent, or Firm* — Knechtel, Demeur & Samlan

(57) ABSTRACT

A trailer designed to be lowered and raised in shallow water to launch a boat or any other type of watercraft. The lowering and raising of the entire trailer is accomplished by (1) the front end of the trailer transforming the tongue and extension of tongue from a substantially straight alignment to a bent alignment by hingedly rotating the extension of tongue in relation to the tongue as facilitated through the use of a first elongated lever or rod and gravity, (2) the rear or back end of the trailer providing a rotation of an extension about the wheel hub to the wheel using a tube surrounding a rear axle that is actuated through the use of a second elongated lever or rod, and (3) all of this being accomplished at the same time from the interaction of the first elongated lever or rod and the second elongated lever or rod through a second arm located at a transitioning hub.

16 Claims, 24 Drawing Sheets

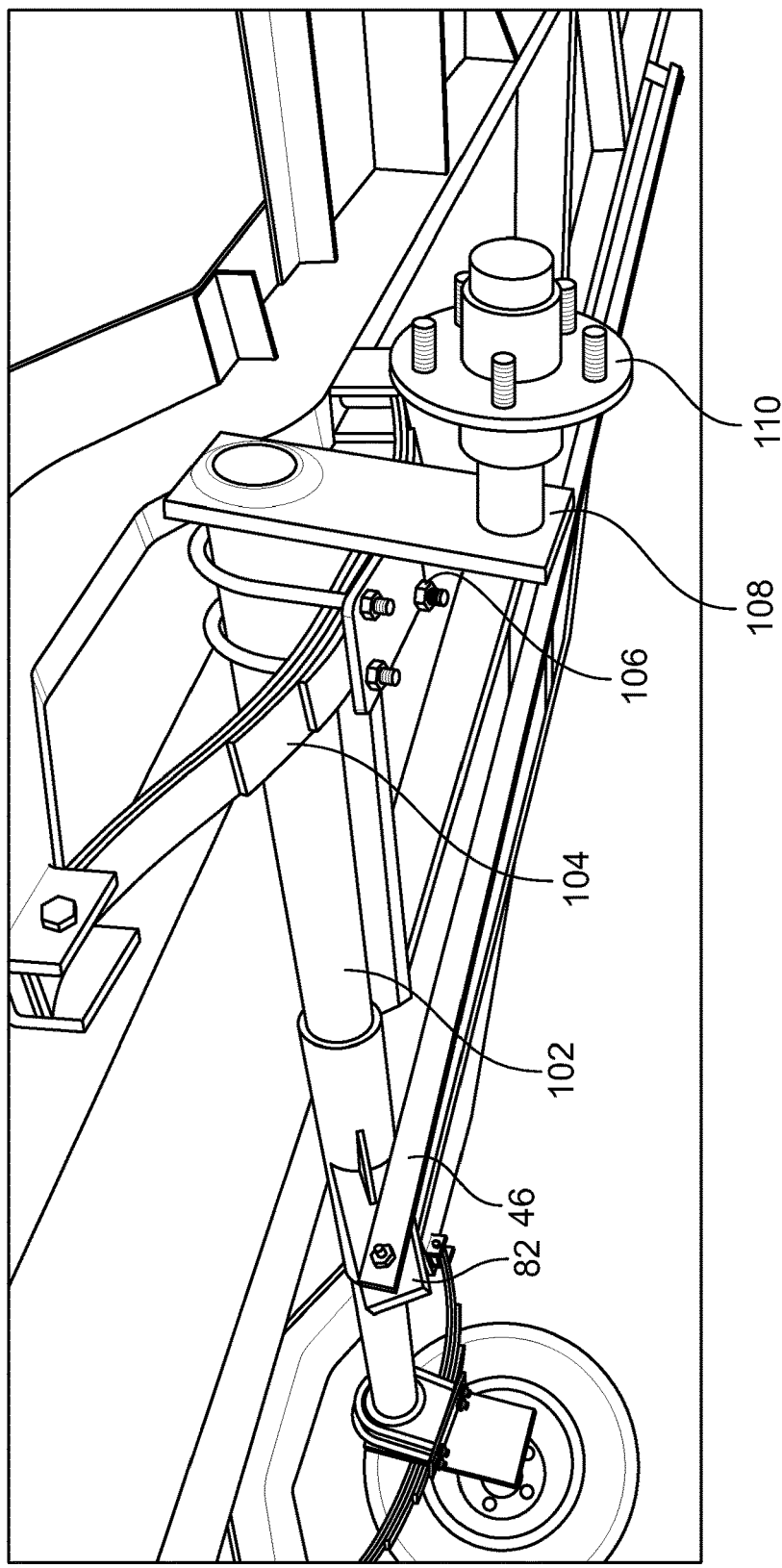

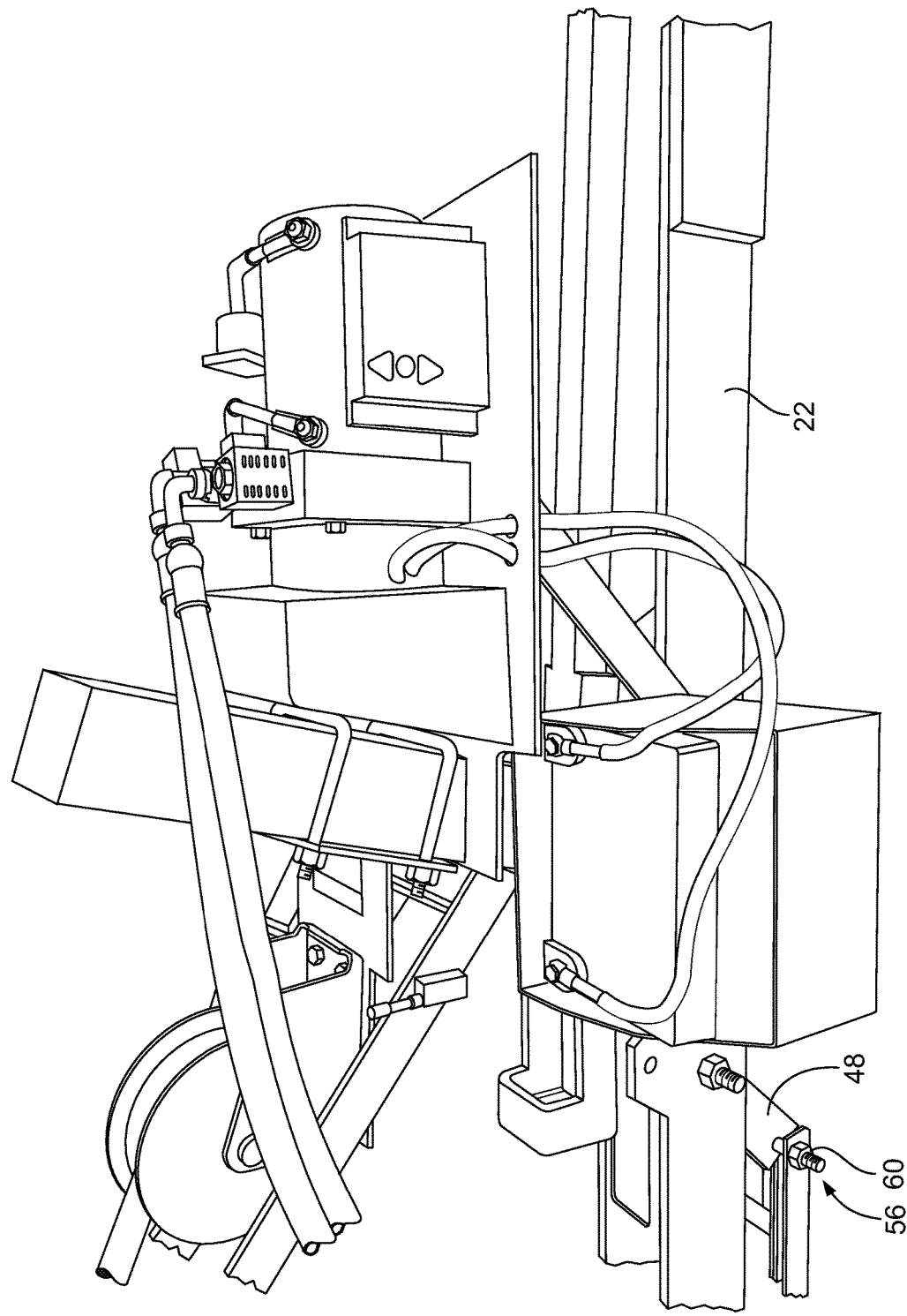

METHOD AND APPARATUS FOR LOWERING ENTIRE BOAT TRAILER IN SHALLOW WATER TO LAUNCH BOAT OR OTHER WATERCRAFT

I. CROSS-REFERENCE TO RELATED APPLICATION

This patent application is a non-provisional application claiming priority from U.S. Provisional Patent Application Ser. No. 62/394,967, entitled "Method and Apparatus for Lowering Entire Boat Trailer in Shallow Water to Launch Boat", filed on Sep. 15, 2016, and is fully incorporated herein by reference.

II. FIELD OF THE INVENTION

The present invention relates to a method and apparatus for lowering and raising an entire boat trailer in shallow water to launch a boat or any other type of watercraft.

III. DESCRIPTION OF THE PRIOR ART

Boat trailers and various mechanisms for launching a boat from a boat trailer into the water have been in the public domain for a long time. Some of these boat trailers and the various mechanisms used to accomplish the same are disclosed in the following patents (listed in chronological order of issuance from most recent to oldest);

| Title of Invention | Pat. No. | Issue Date |
|---|---|---|
| Boat Trailer | 5,292,145 | Mar. 8, 1994 |
| Lifting and Lowering Device For Trailers | 3,856,319 | Dec. 24, 1974 |
| Boat Transporting, Launching Retrieving Trailer | 3,812,988 | May 28, 1974 |
| Trailer | 3,032,218 | May 1, 1962 |
| Boat-Carrying Trailer | 2,937,775 | May 24, 1960 |
| Trailer For Transporting Boats | 2,835,400 | May 20, 1958 |
| Boat Trailers | 2,835,399 | May 20, 1958 |
| Vehicle Suspension and Raising/Lowering Means | 2,788,908 | Apr. 16, 1957 |

Upon review of the disclosure(s) for these various boat trailer inventions, although useful in certain circumstances, these boat trailers, in connection with today's boat launching needs, contain various shortcomings which, include but are not limited to: (i) not designed or reasonably feasible for use in launching a boat into shallow water; (ii) appear to require the use of non-standard boat trailers and therefore is limited to only those boats that the trailer can accommodate; (ii) provides only the lowering of the rear of the boat trailer and requires gravity of the boat to complete launch into the water; and/or (iv) provides the raising of rollers to angle the boat (not the trailer) and then again requires gravity of the boat to complete launch into the water, Applicant's invention, on the other hand, provides a boat trailer solution that solves these above identified shortcomings and is specifically designed for today's launching boats needs, especially in shallow water.

Accordingly, there is a need, therefore, and there has never been disclosed Applicant's unique method and apparatus for lowering and raising an entire boat trailer in shallow water to launch a boat or any other type of watercraft (collectively referred to herein as a "boat").

IV. SUMMARY OF THE INVENTION

The present invention is a trailer designed to be lowered and raised in shallow water to launch a boat or any other type of watercraft. The lowering and raising of the entire trailer is accomplished by (1) the front end of the trailer transforming the tongue and extension of tongue from a substantially straight alignment to a bent alignment by hingedly rotating the extension of tongue in relation to the tongue as facilitated through the use of a first elongated lever or rod and gravity, (2) the rear or back end of the trailer providing a rotation of an extension about the wheel hub to the wheel using a tube surrounding a rear axle that is actuated through the use of a second elongated lever or rod, and (3) all of this being accomplished at the same tune from the interaction of the first elongated lever or rod and the second elongated lever or rod through a second arm located at a transitioning hub.

V. BRIEF DESCRIPTION OF THE DRAWINGS

The Description of the Preferred Embodiment will be better understood with reference to the following figures.

Figure 7B:
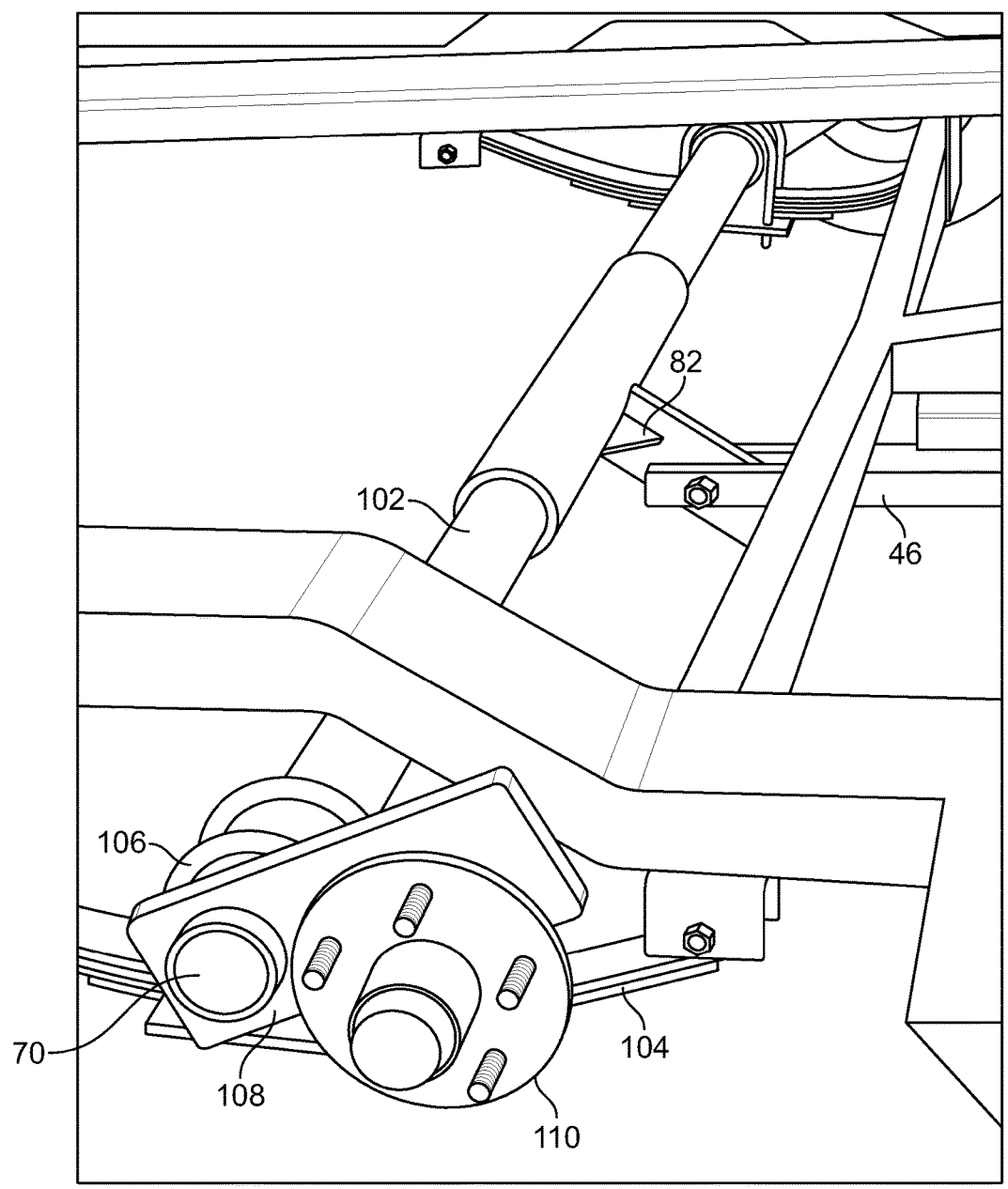

FIG. 7a is a side perspective view, with the wheel removed, illustrating the rear axle, extension, hub, and lever or rod used in connection with the same as positioned in the raised road transit or transport position FIG. 7b is a side perspective view, with the wheel removed, illustrating the rear axle, extension, hub, and lever or rod used in connection with the same as positioned in the lowered launching/loading position.

FIGS. 8a through 8i is a perspective view illustrating the process for lowering and raising of the front end of the boat trailer of Applicant's invention.

FIGS. 9a through 9e is a perspective view illustrating the process for lowering and raising of the rear or back end of the boat trailer of Applicant's invention.

Figure 10:
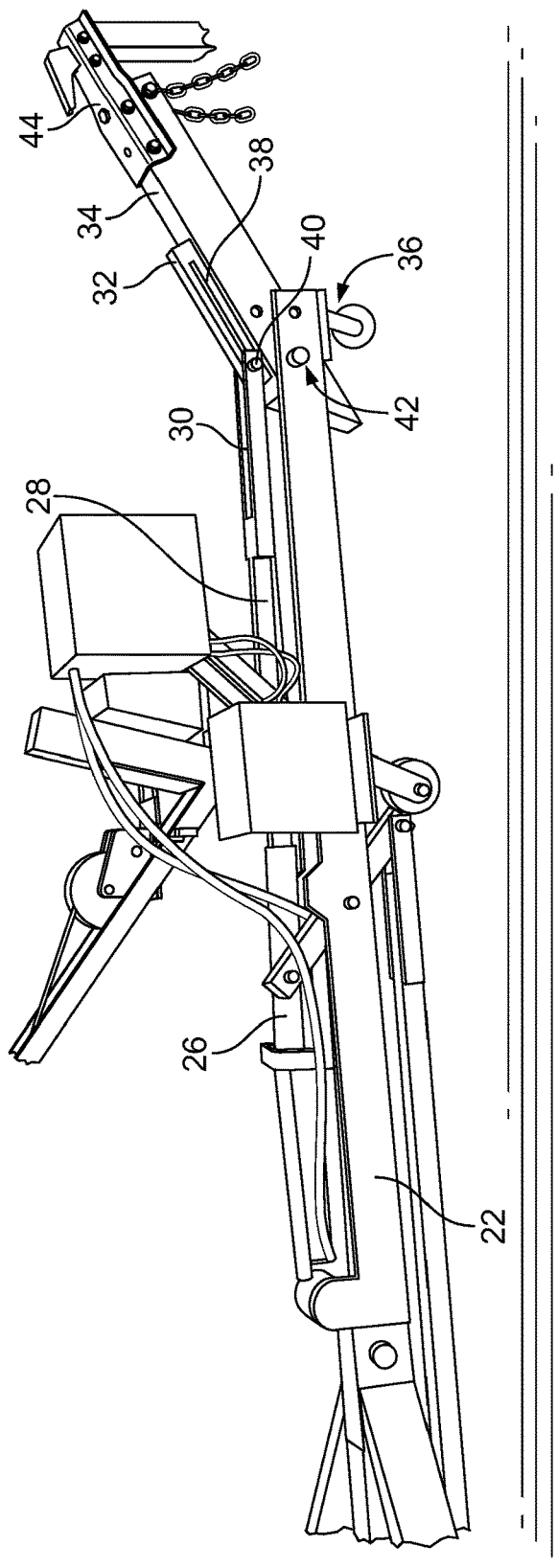

FIG. 10 is a side perspective view of the front section of the boat trailer of Applicant's invention and, in particular, illustrating the preferred embodiment of the hydraulic cylinder for operating the trailer.

FIG. 11 a side perspective view of the front section of the boat trailer of Applicant's invention and, in particular, illustrating the internal components of the preferred embodiment of the hydraulic cylinder for operating the trailer.

VI. DETAILED DESCRIPTION OF THE PREFERRED EMBODIMENT

Figure 1:
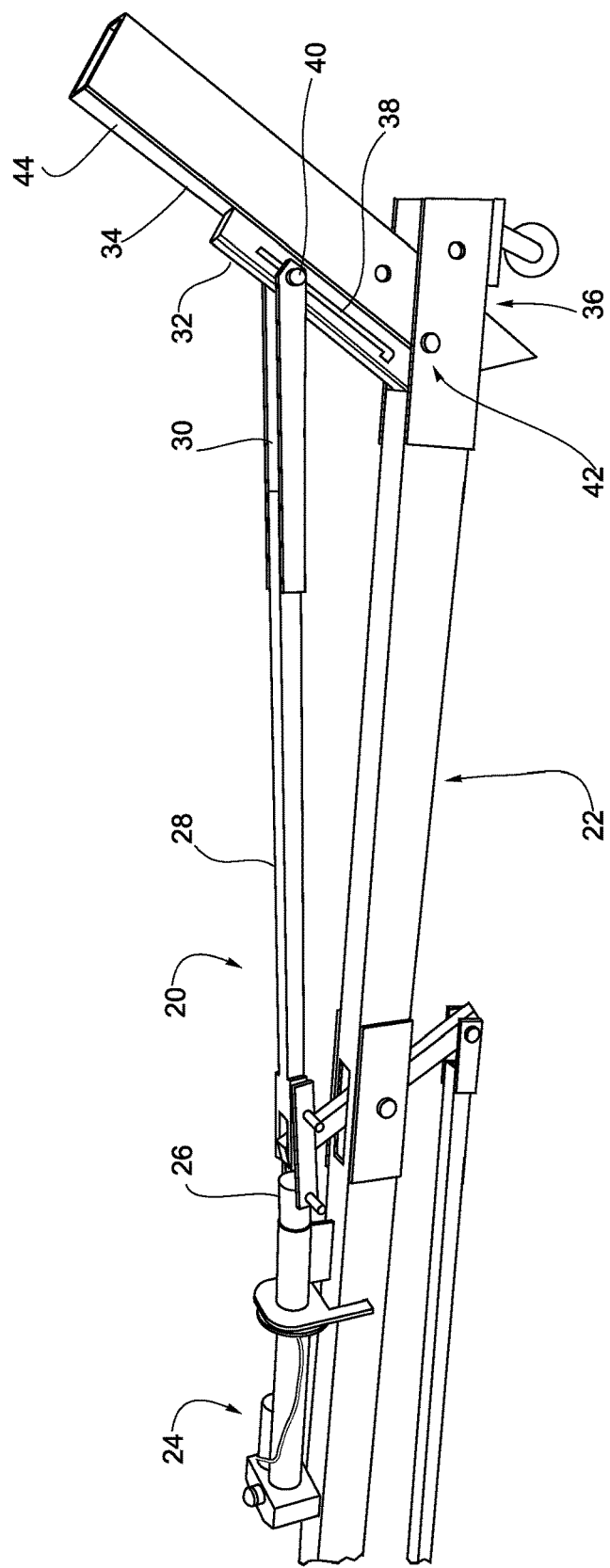
FIG. 1 is a side perspective view of the front section of the boat trailer of Applicant's invention.

Turning to FIG. 1, there is illustrated a front section of Applicant's boat trailer 20 having a tongue 22. The tongue 22 extends longitudinally toward the front end of the trailer 36 and terminates in a extension of tongue 44. In the preferred embodiment, the tongue 22 includes a hinge 42, situated adjacent to the front end of the trailer 36, in order to facilitate the rotation of the extension of tongue 44 in relation to the tongue 22.

Affixed to the tongue 22 is an electric trailer tongue jack 24, which preferably is a 4500 lb., 12 volt electric trailer tongue jack powered by the tow vehicle. Alternatively, as illustrated in FIGS. 10 and 11 and the preferred embodiment, is a hydraulic cylinder 19 powered by a 12 volt hydraulic pump to operate the trailer 20.

Figure 5:
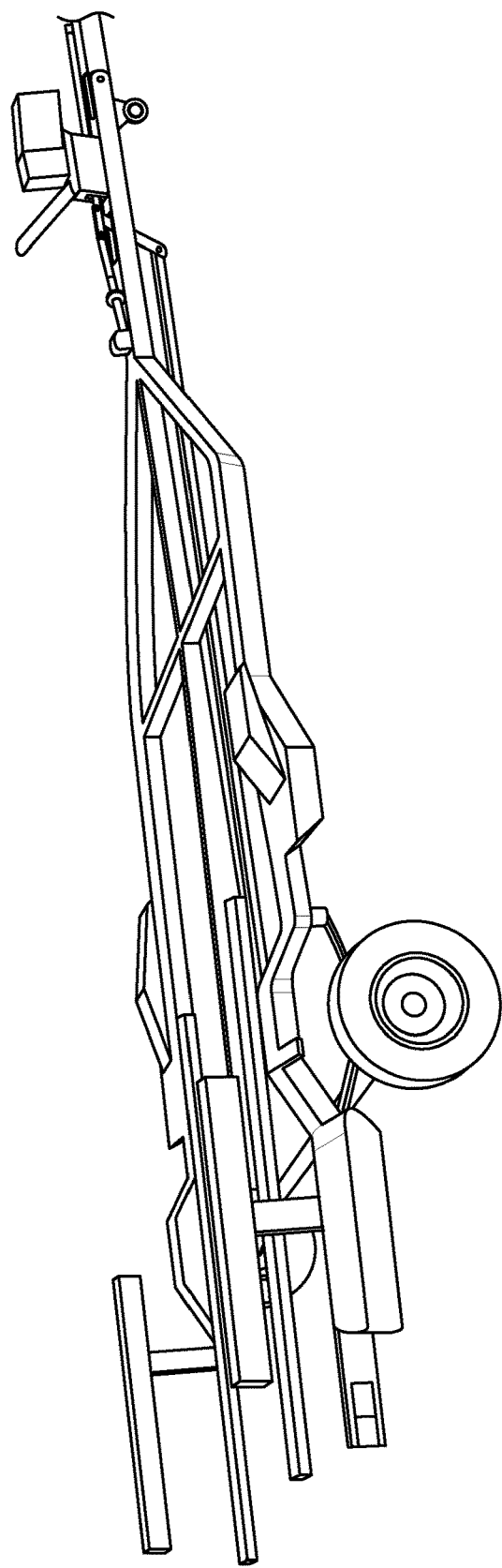
FIG. 5 is a side perspective view of the boat trailer of Applicant's invention in the raised road transit or transport position.
Figure 8A:
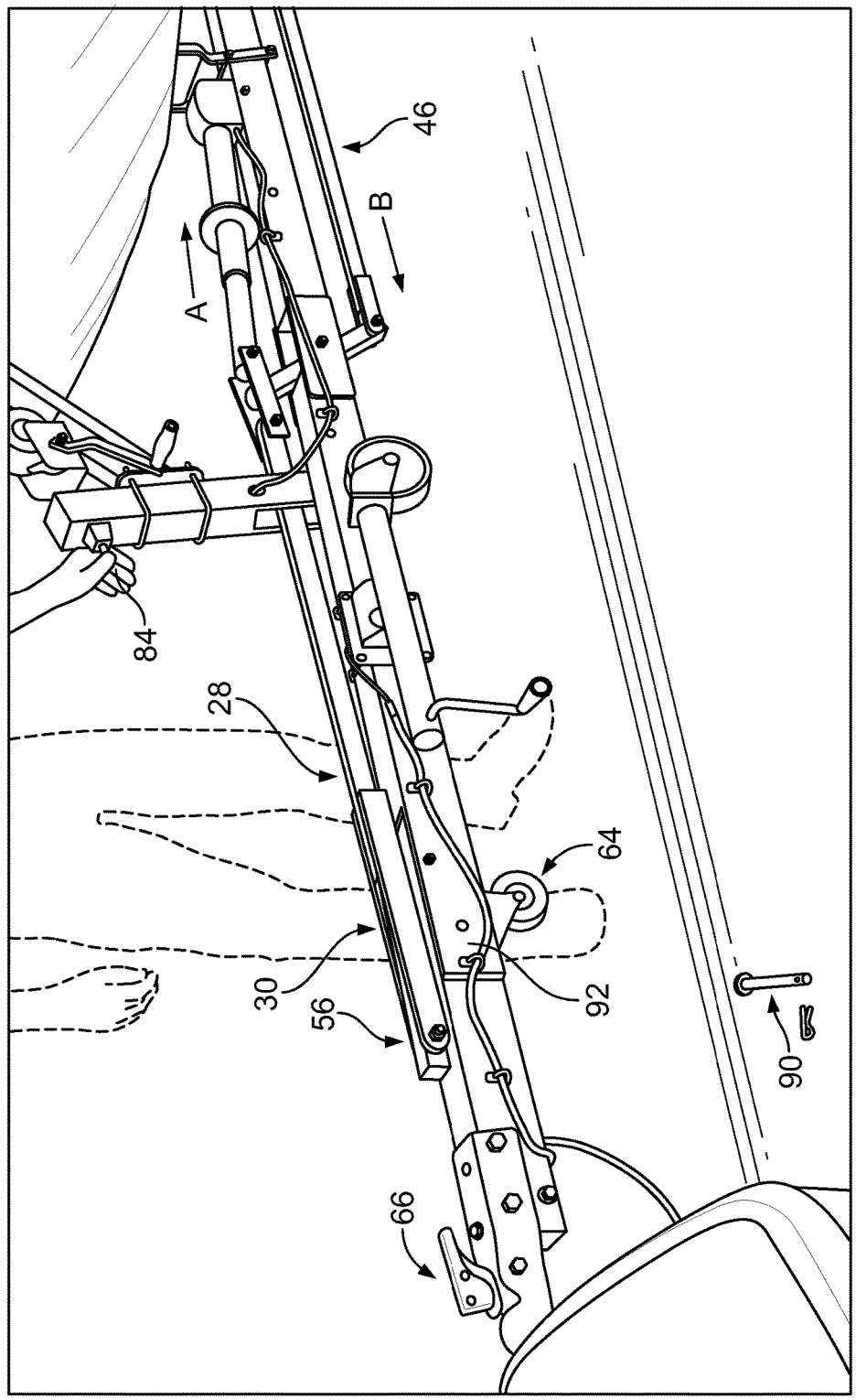

Extending outwardly from the electric trailer tongue jack 24 is an inner jack tube 26 mechanically connected to a first elongated lever or rod 28. The first elongated lever or rod 28 extends longitudinally along the tongue 22 toward the front end 36 of the trailer 20. The first elongated lever or rod 28 provides an open channel 30 located adjacent its distal end 32 and terminates with an actuating member 40 for coupling to an external front arm 34 having an open slot 38. The external front arm 34 is preferably a 2" square tubing welded to extension of tongue 44 with providing the open slot 38 so that the actuating member 40 of the first elongated lever or rod 28 can float as needed during the lowering process. In the preferred embodiment, the actuating member 40 of the lever or rod 28 is inserted through the open slot 38 of the external front arm 34 thereby releaseably affixing the first elongated lever or rod 28 to the extension of tongue 44. In this manner, the first elongated lever or rod 28 is longitudinally positioned adjacent, and releaseably affixed, to the tongue 22 in the road transport position, as illustrated in FIGS. 5 and 8a. In the raising process, when the actuating member 40 of the lever or rod 28 reaches one end, of the external front arm 34, it forces extension of tongue 44 up to bring front end 36 of the trailer 20 and tongue 22 to road transport position (see FIG. 8a).

The actuating member 40 of the first elongated lever or rod 28 is engagedly moveable in connection with the open slot 38 of the external front arm 34 fixedly secured to the extension of tongue 44 with pivot hinge 42 at the front end 36 of the trailer 20. The open channel 30 of the lever or rod 28 is of sufficient longitudinal length and width to receive the external front arm 34. The movement of the actuating member 40 of the first elongated lever or rod 28 in relation to the open slot 38 co-actively force the extension of tongue 44 to pivot and rotate or move in relation to the tongue 22. For example, when the first elongated lever or rod 28 is forced rearward or backward by the inner jack tube 26 or actuating tube, the actuating member 40 traverses through the open slot 38 allowing the external front arm 34 to rotate downward and out from a position within the channel 30 of the level or rod 28. As explained in more detail below, when this occurs, it forces the front end 36 of the trailer 20 to go down.

Figure 2:
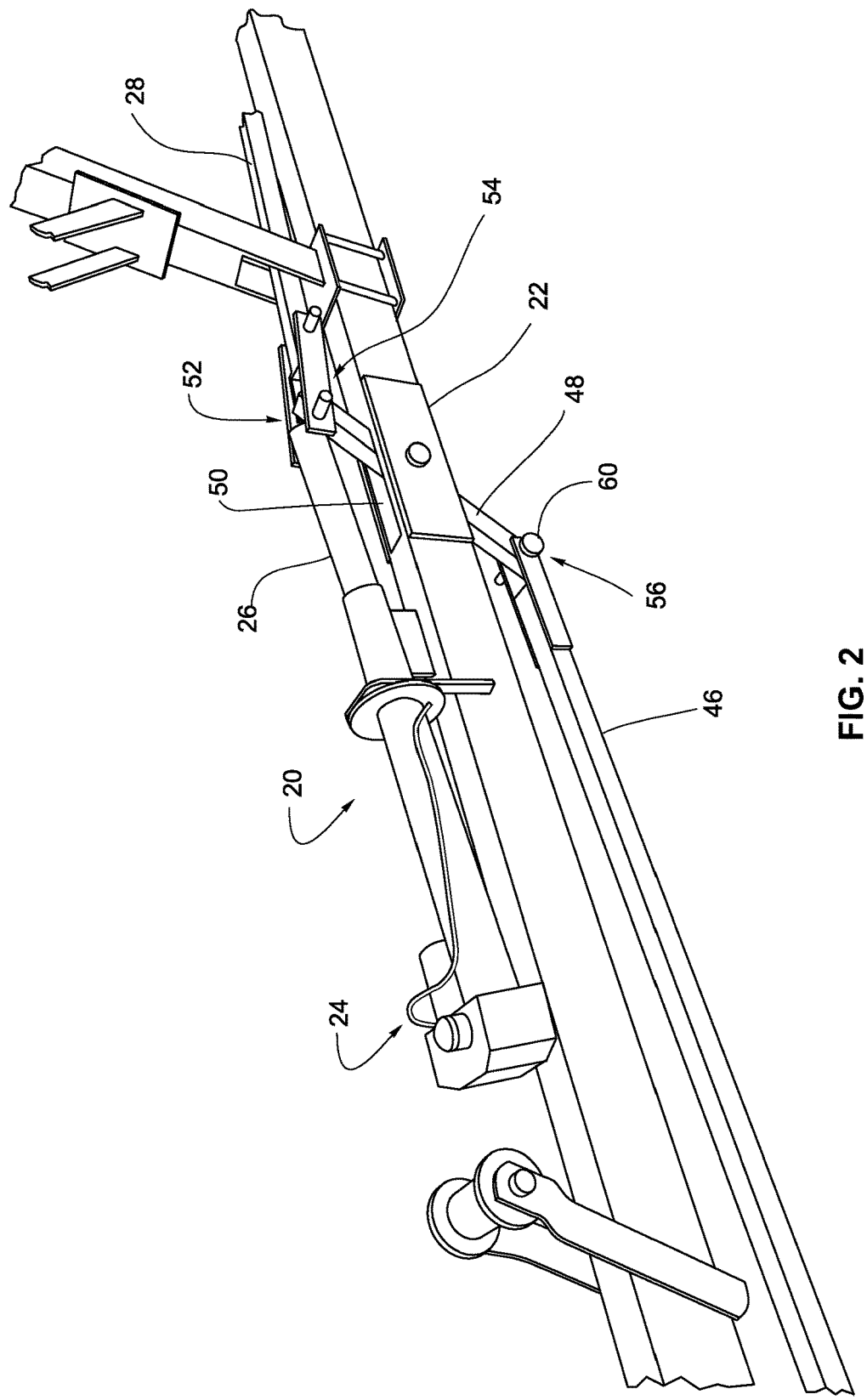
FIG. 2 is a side perspective view of the middle and front sections of the boat trailer of Applicant's invention.

Turning to FIG. 2, there is illustrated a middle and front section of the trailer 20. As shown, the inner jack tube 26 of the electric trailer tongue jack 24 is mechanically and releaseably connected to a second arm 48. The mechanical and releasable connection may be a hinge pin or any other means known to one skilled in the art. In the preferred embodiment, the inner jack tube 26 is affixed to both the first elongated lever or rod 28 and the second arm 48 at the same location, referred to herein as the transitioning hub 52.

The second arm 48, with its proximal end 54 at the transitioning hub 52, extends downwardly through a central opening 50 in the tongue 22 and having a distal end 56 releaseably affixed to a second elongated lever or rod 46. Additionally, in the preferred embodiment, the distal end 56 of the second arm 48 forms a hinge 60 with the second elongated lever or rod 46 in order for the second arm 48 to facilitate the movement of the second elongated lever or rod 46, as discussed in snore detail herein.

The second elongated lever or rod 46 then extends longitudinally along the tongue 22 toward the back end 58 (see FIG. 3) of the trailer 20.

Figure 3:
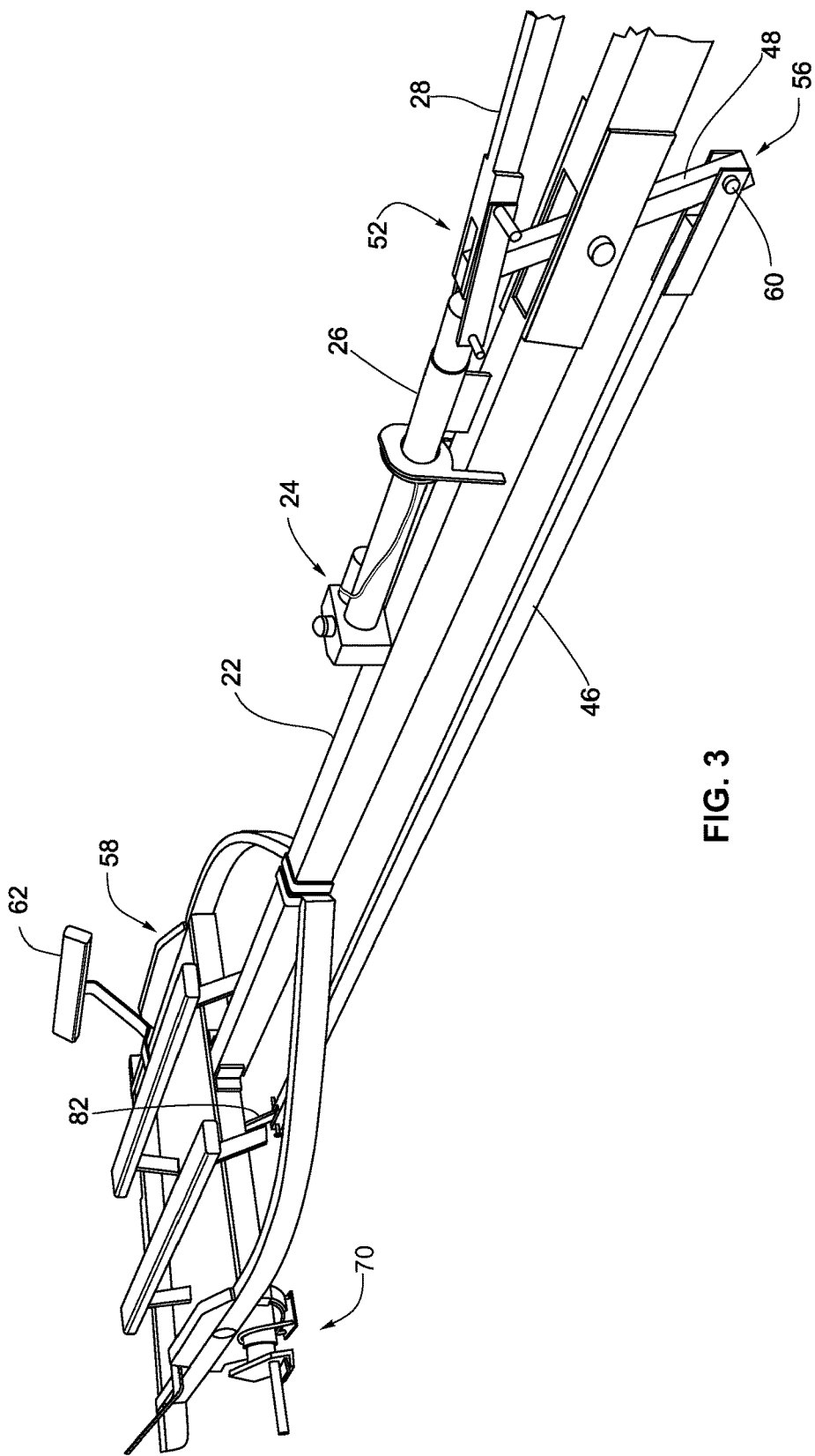
FIG. 3 is a side perspective view of the middle and rear sections of the boat trailer of Applicant's invention.
Figure 4:
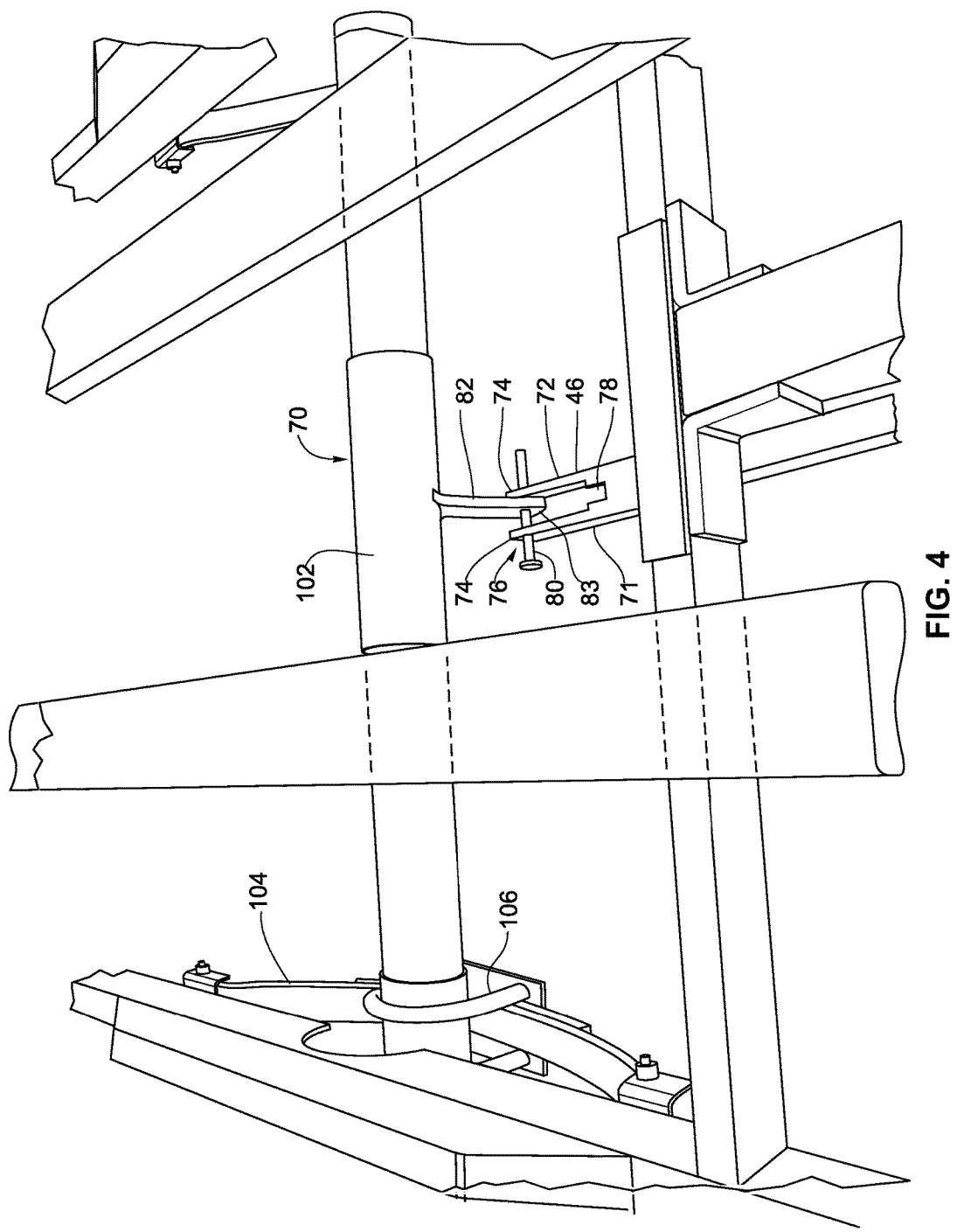
FIG. 4 is a top perspective view of the rear section of the boat trailer of Applicant's invention and, in particular, the rear axle and lever or rod used in connection with the same.

Turning to FIG. 3, there is illustrated a middle and rear sections of the trailer 20. As shown, the second elongated lever or rod 46 extends longitudinally along the tongue 22 toward the back end 58 of the trailer 20. Also illustrated are the other components of the trailer 20 which include but are not limited to a plurality of bunks 62, rear axle 70 (FIGS. 3 and 4), caster wheel 64 (see FIG. 8), tow hitch 66 (FIG. 8), wheels 68 (FIG. 9), Turning to FIG. 4, in the preferred embodiment, the second elongated lever or rod 46 terminates at its distal end 71 into a fork 72 having opposed ends 74, each opposed ends 74 having a hole 76 adjacent an open channel 78 between them. A flange 82 extends outwardly from the rear axle 70, surrounded by a tube 102 (see FIG. 7), and into and/or within the open channel 78 of the opposed ends 74 of the fork 72. The flange 82 is also provided with a hole 83. Upon alignment of the hole 83 in the flange 82 within the open channel 78 between the holes 76 of the opposed ends 74, a hinge pin 80 can be inserted to releaseably affix the second elongated lever or rod 46 to the rear axle 70. In this manner, the second elongated lever or rod 46 is releaseably affixed to the rear axle 70.

Turning to FIGS. 7a and 7b, the means for transitioning between the raised transport position and the lowered launching/loading position of the rear or back end of the trailer 20 is more clearly illustrated. The tube 102 surrounds the rear axle 70. Preferably, the tube 102 is mechanically coupled to a spring suspension 104 by a u-bolt 106 or any other means known to one skilled in the art. The tube 102 is fixedly secured (i.e., welded) to an extension 108 that is then fixedly secured (i.e., welded) to a wheel hub 110. The wheel 68 (see FIG. 9) is then releaseably mounted on the wheel hub 110.

Turning to FIGS. 8 and 9, the method or process for lowering and raising of the front end of the trailer 20 and the method or process for lowering and raising of the rear or back end of the trailer 20, respectively, are more clearly illustrated.

Figure 6:
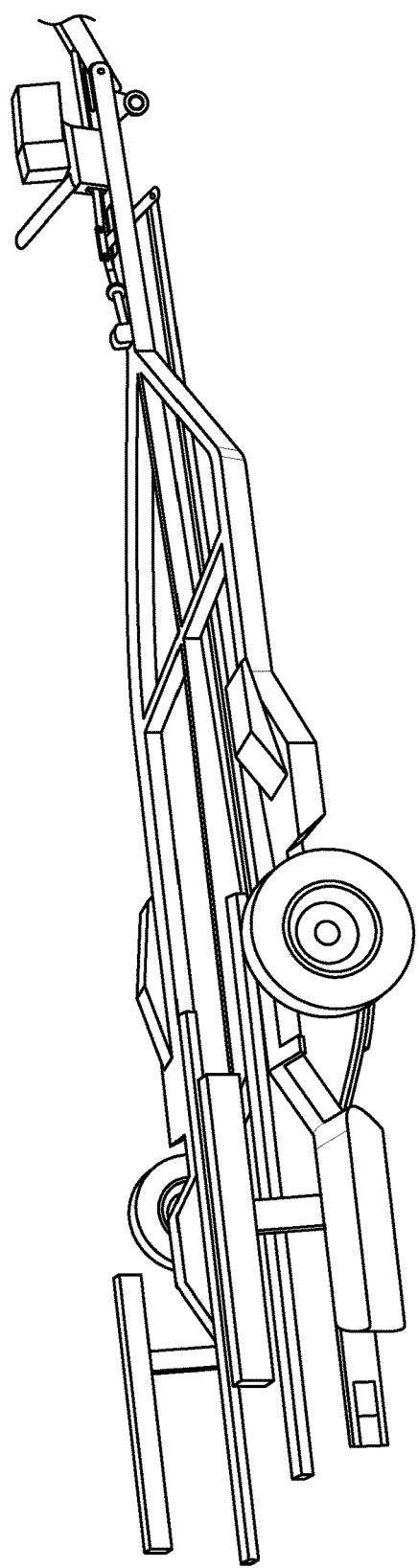
FIG. 6 is a side perspective view of the boat trailer of Applicant's invention in the lowered launching/loading position.

Based on the foregoing, Applicant's invention is the method and apparatus (i.e., the use of the hydraulic cylinder 19 or electric trailer tongue jack 24, actuating member 40 of the first elongated lever or rod 28 in relation to the open slot 38 of the external front arm 34 affixed to the extension of tongue 44, and use of transitioning hub 52 for moving first and second elongated levers or rods 28, 46, and the second arm 48, etc. to lower the entire trailer 20 (e.g., both the front end and the back end of a trailer) in the same process from the road transit or transport position, as illustrated in FIG. 5, to the lowered launching/loading position, as illustrated in FIG. 6, and then raise the entire trailer 20 (e.g., both the front end and the back end of a trailer 20) from the lowered launching/loading position to return back to the road transit or transport position.

Lowering the Front End of the Trailer 20

Figure 8B:
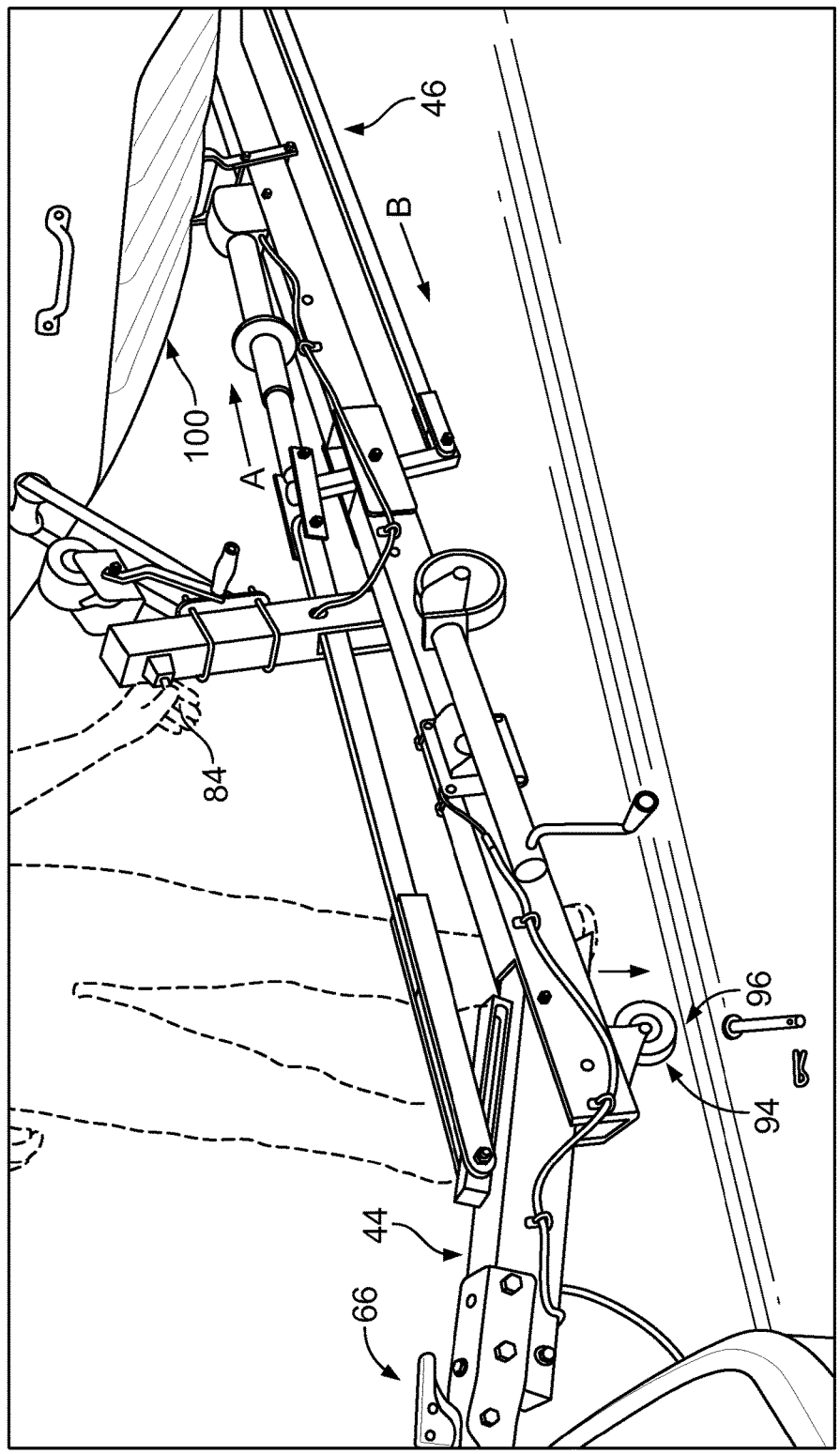
Figure 8C:
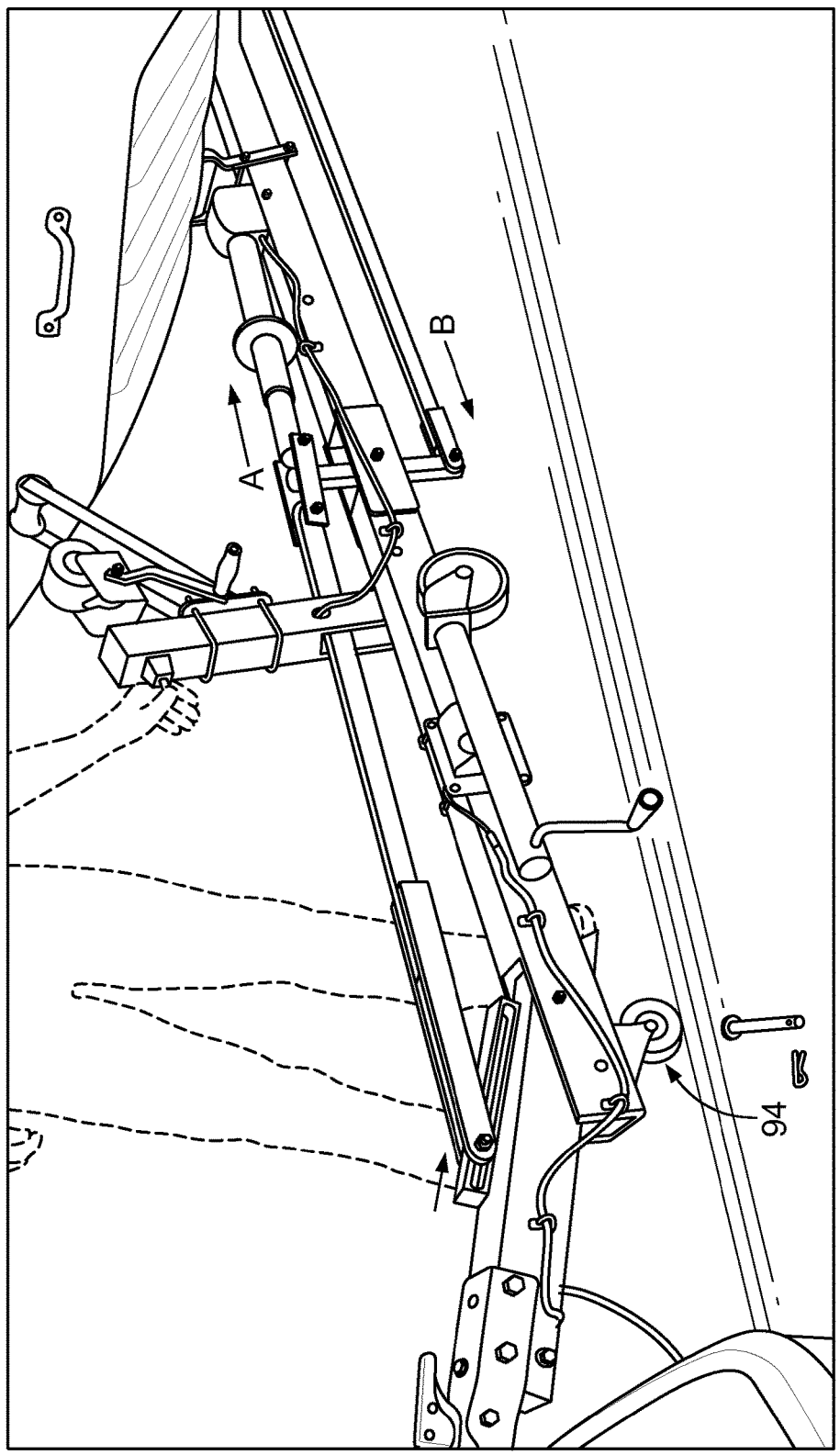
Figure 8D:
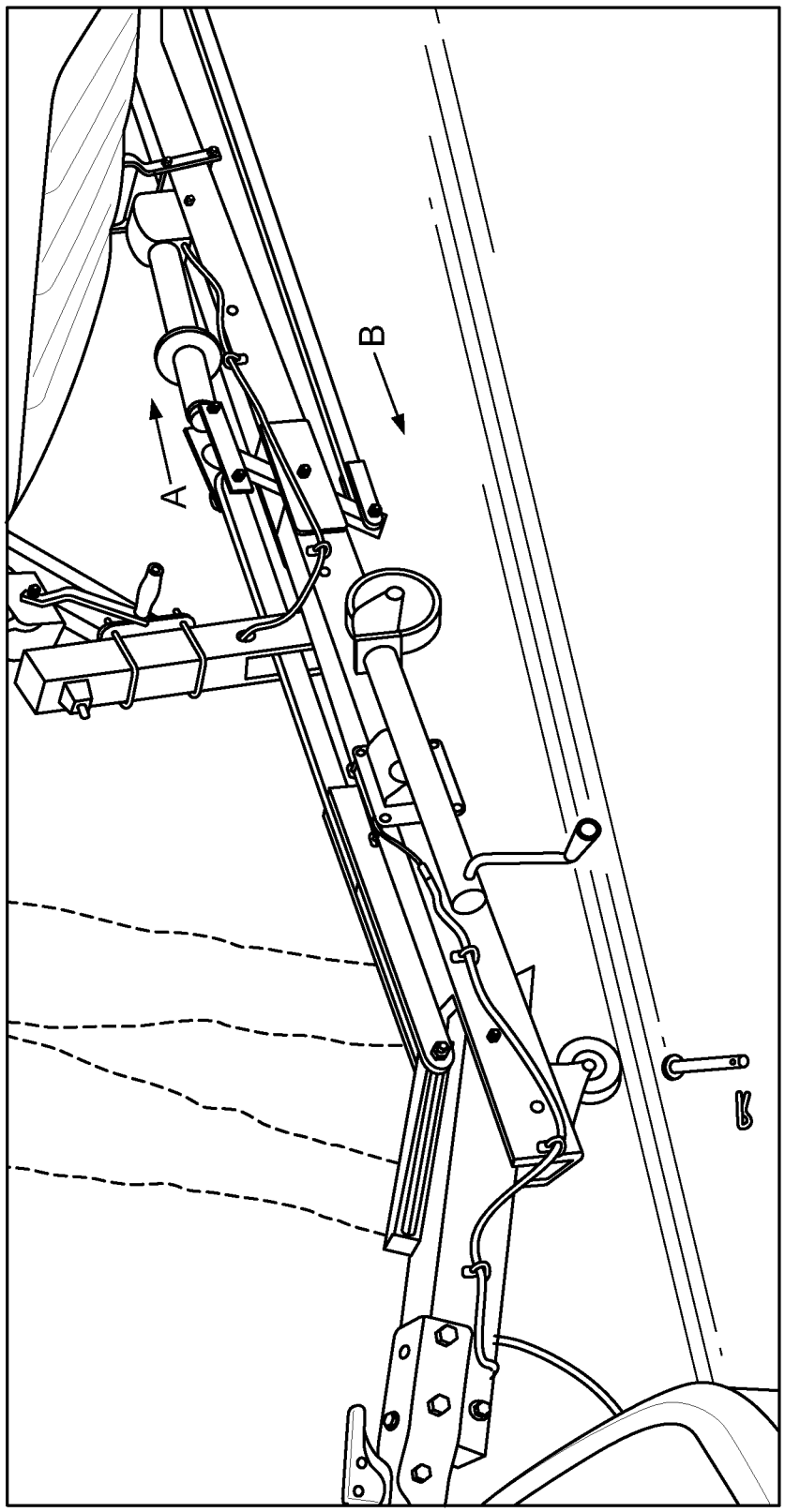
Figure 8E:
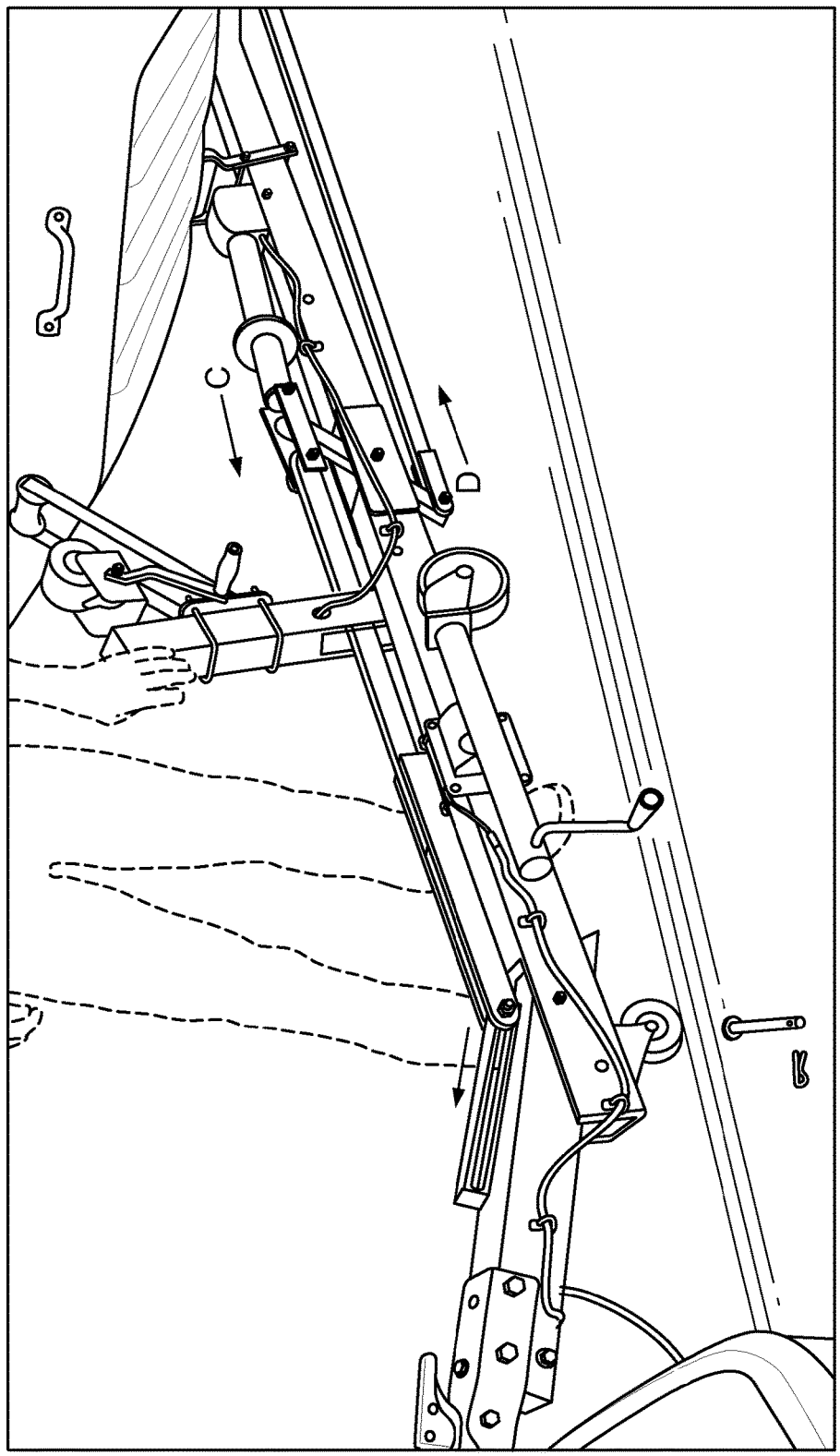

More specifically, the method or process for lowering the front end 36 of the trailer 20 is illustrated in FIGS. 8a through 8e. In use and turning to FIG. 8a from the road transit or transport position, the tongue 22 and the extension of tongue 44 are in substantially horizontal or straight alignment. A safety pin 90 positioned in slot 92 in the tongue 22 releaseably affixes the tongue 22 to the extension of tongue 44. The external front arm 34 is likewise in substantial horizontal or straight alignment with the first elongated lever or rod 28 with the external front arm 34 positioned or resting within the channel 30 of the first elongated lever or rod 28 and the actuating member 40 positioned or resting within the open slot 38 of the external front arm 34. When the electric trailer tongue jack 24 is activated using mechanical switch 84 (or hydraulic cylinder 19 as illustrated in FIGS. 10 and 11), the inner jack tube 26 or actuating tube is activated and retracts or is forced backward in the direction of Arrow A. If the safety pin 90 is removed from the slot 92 (i.e., such that the tongue 22 is no longer affixed or secured to the extension of tongue 44), gravity, through the weight of the extension of tongue 44 of the trailer 20, forces the extension of tongue 44 to rotate about both the trailer hitch 66 and the pivot hinge 42 in the downward direction with the extension of tongue 44 being released from and out of the channel 30 of the first elongated lever or rod 28, as illustrated in FIG. 8b. The extension of tongue 44 will continue to rotate in this downward direction until the front wheel 94 engages the ground 96, as illustrated in FIG. 8c. If a boat 100 is on the trailer 20, the additional weight of the boat 100 will add to the gravity and force the extension of tongue 44 down and front wheel 94 to the ground quicker. As this is occurring, the retraction of the inner jack tube 26 or actuating tube is forcing the first elongated lever or rod 28 in the backward direction, or in the direction of Arrow A. With the first elongated lever or rod 28 moving backward in the direction of Arrow A, this causes the actuating member 40 at the end of the first elongated lever or rod 28 to traverse in the same backward direction through the open slot 38 of the external front arm 34 thereby releasing the pressure on the extension of tongue 44 so that it can move. This backward movement of the inner jack tube 26 or actuating tube simultaneously also causes the proximal end 54 of the second arm 48 to likewise move or extend backward in the direction of Arrow A through the transitioning hub 52. As this occurs, the distal end 56 of the second arm 48 is forced to move in the forward direction, or in the opposite direction of the proximal end 54 of the second arm 48, as shown in the direction of Arrow B. This forward direction of the distal end 56 of the second arm 48, in turn, causes the second elongated lever or rod 46 to likewise move in the same forward direction or in the direction of Arrow B, as illustrated in FIG. 8d. This continues until the front end 36 of the trailer 20 is in the lowered launching/loading position, as illustrated in FIG. 8e. Also, in the preferred embodiment, the wheel 94 is of sufficient height such that the second elongated lever or rod 46 does not engage the ground 96 even when the trailer 20 is in the lowered launching/loading position.

Raising the Front End of the Trailer 20

Figure 8F:
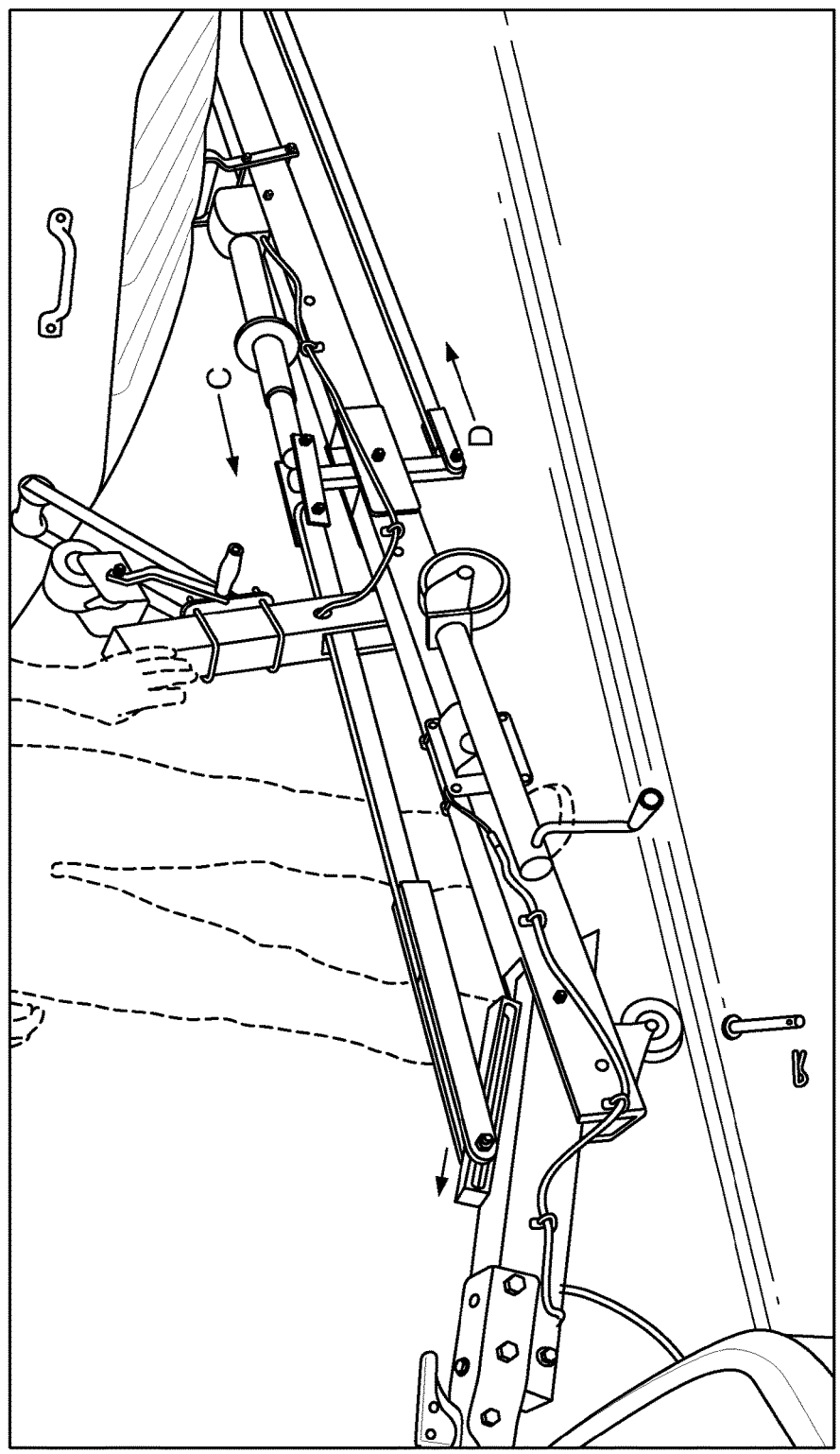
Figure 8G:
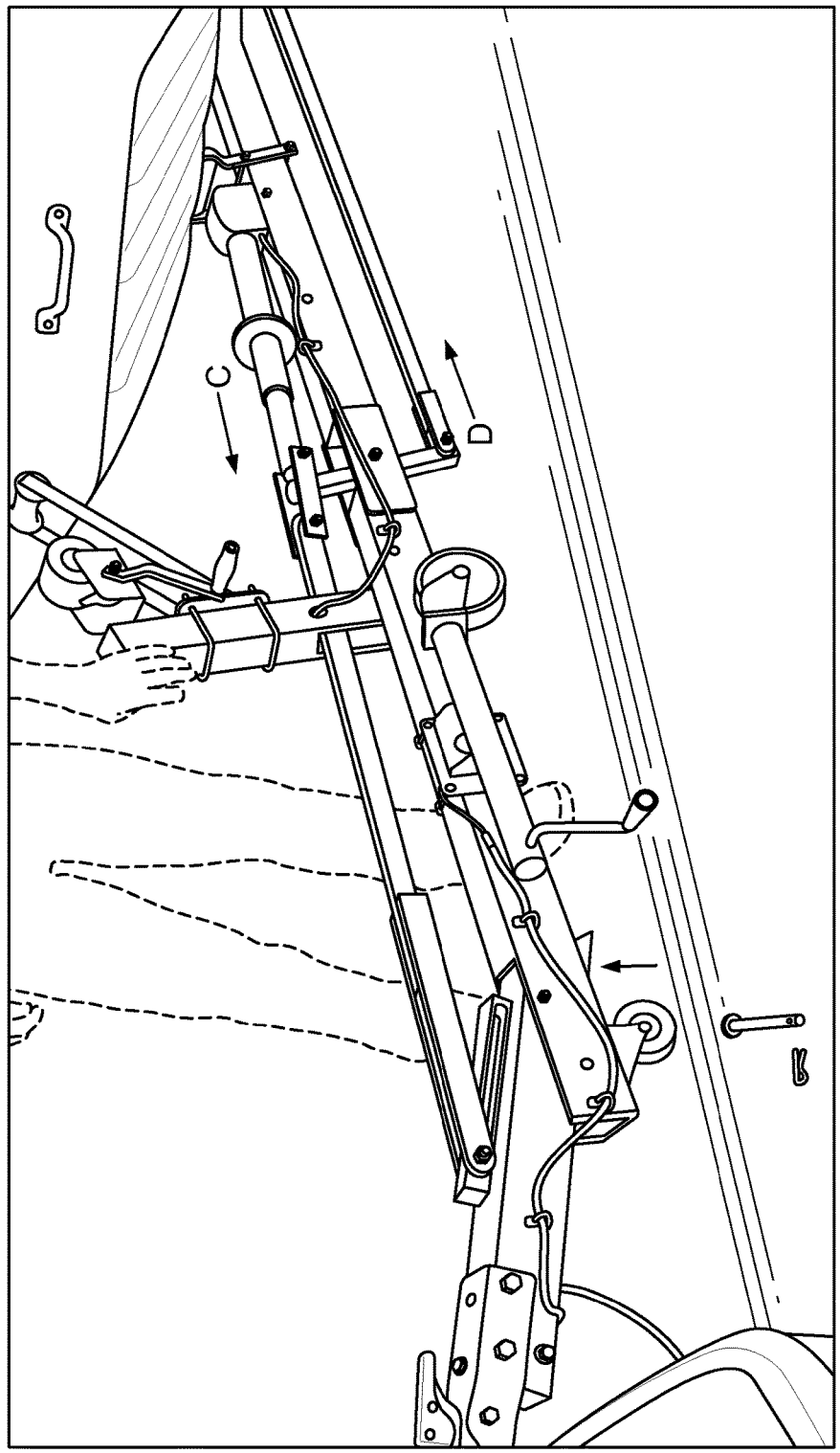
Figure 8H:
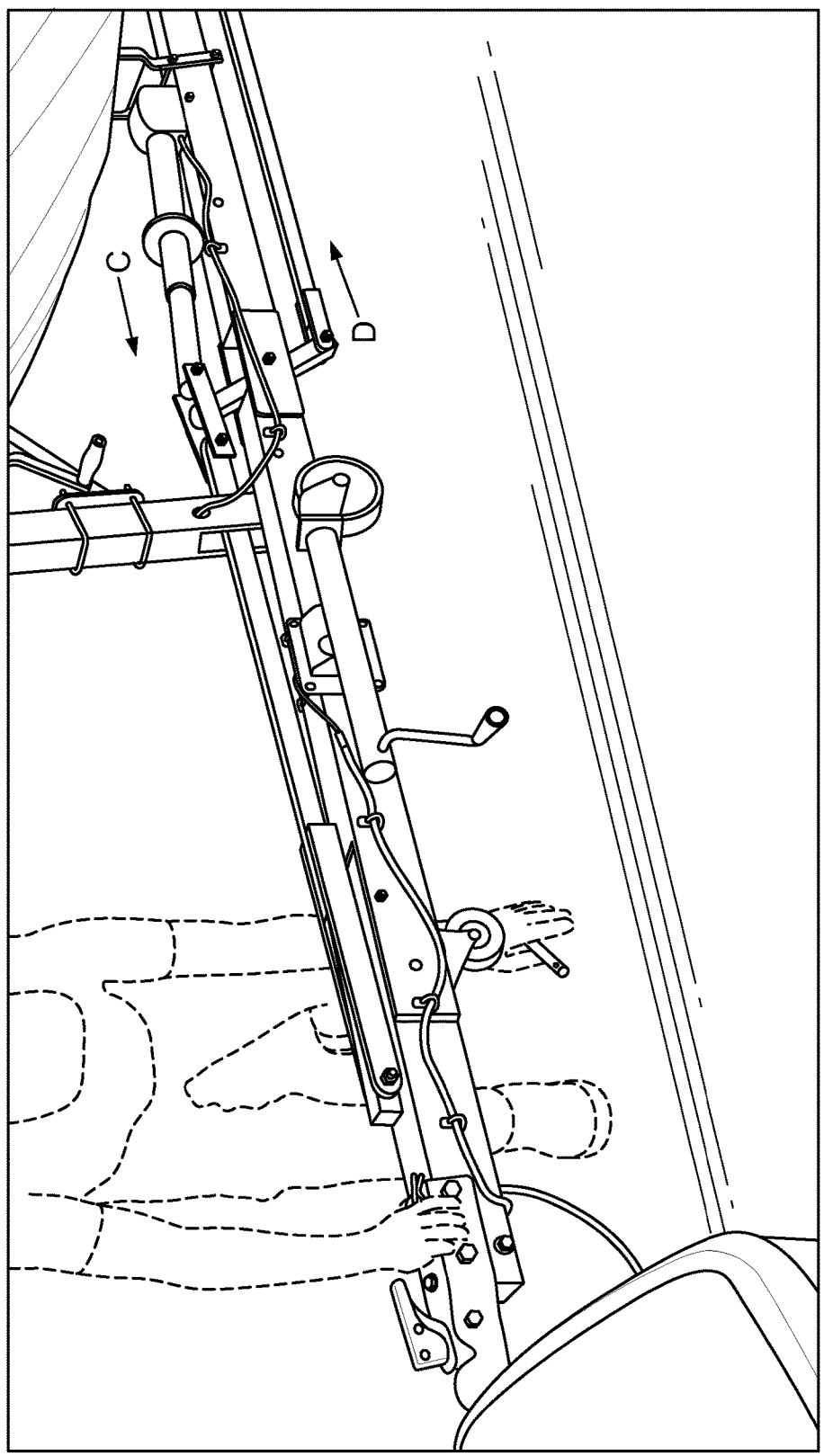
Figure 8I:
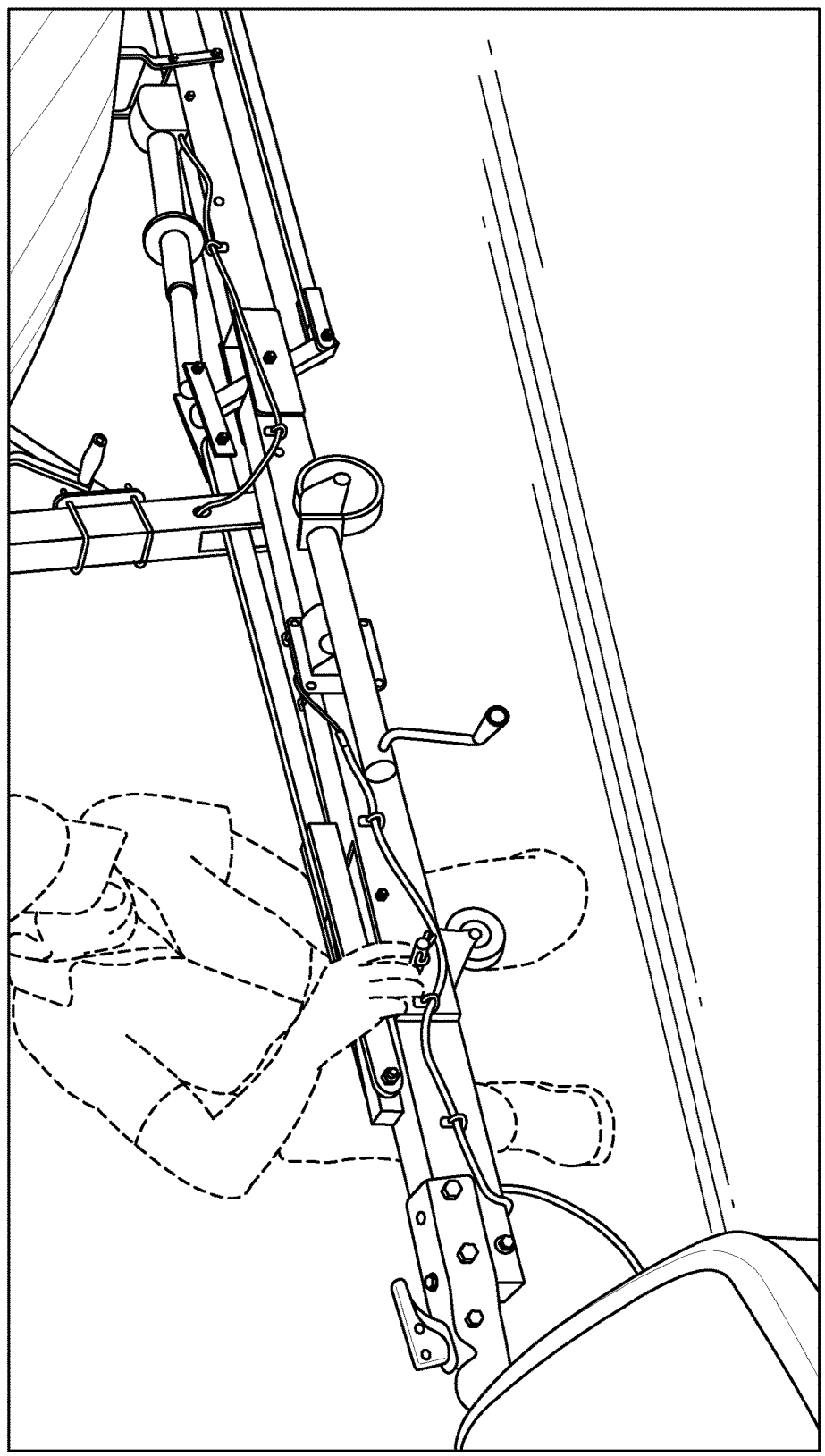

The method or process for raising the front end 36 of the trailer 20 is illustrated in FIGS. 8f through 8i. Turning to FIG. 8f from the lowered launching/loading position and reversing the process, when the electric trailer tongue jack 24 is re-activated using mechanical switch 84 (or hydraulic cylinder 19 as illustrated in FIGS. 10 and 11), the inner jack tube 26 or actuating tube is activated and extended or is forced forward in the direction of Arrow C. This extension of the inner jack tube 26 likewise forces the first elongated lever or rod 28 in the same forward direction, or in the direction of Arrow C. This forward movement of the inner jack tube 26 or actuating tube simultaneously causes the proximal end 54 of the second arm 48 to likewise move or extend forward in the direction of Arrow C through the transitioning hub 52. As this occurs, the distal end 56 of the second arm 48 is forced to move in the backward direction, or in the opposite direction of the proximal end 54 of the second arm 48, as shown in the direction of Arrow D. This backward direction of the distal end 56 of the second arm 48, in turn, causes the second elongated lever or rod 46 to likewise move in the same backward direction or in the direction of Arrow D, as illustrated in FIG. 8g. At this point, the actuating member 40 of the first elongated lever or rod 28 has traversed forward through and reached the terminal end of the open slot 38 of the external front arm 34. When this occurs, the continued forward movement of the first elongated level or rod 28 causes the extension of tongue 44 to rotate about both the trailer hitch 66 and the pivot hinge 42 in the upward direction thereby also removing the front wheel 94 from engagement with the ground 96, as illustrated in FIG. 8g. The extension of tongue 44 will be forced, by the first elongated level or rod 28, to continue to rotate about both the trailer hitch 66 and the pivot hinge 42 in the upward direction until the extension of tongue 44 is received back into the channel 30 of the first elongated lever or rod 28, as illustrated in FIG. 8h. At this point, the tongue 22 and the extension of tongue 44 are then back in substantially horizontal or straight alignment, the external front arm 34 is likewise back in substantial horizontal or straight alignment with the first elongated lever or rod 28 with the external front arm 34 positioned or resting within the channel 30 of the first elongated lever or rod 28 and the actuating member 40 positioned or resting within the open slot 38 of the external front aim 34, the safety pin 90 re-positioned in the slot 92 in the tongue 22 releaseably re-affixing the tongue 22 to the extension of tongue 44, and thereby resulting in the front end 36 of the trailer 20 being raised back to the road transit or transport position, as illustrated in FIG. 8i.

Lowering the Rear or Hack End of the Trailer 20

Figure 9A:
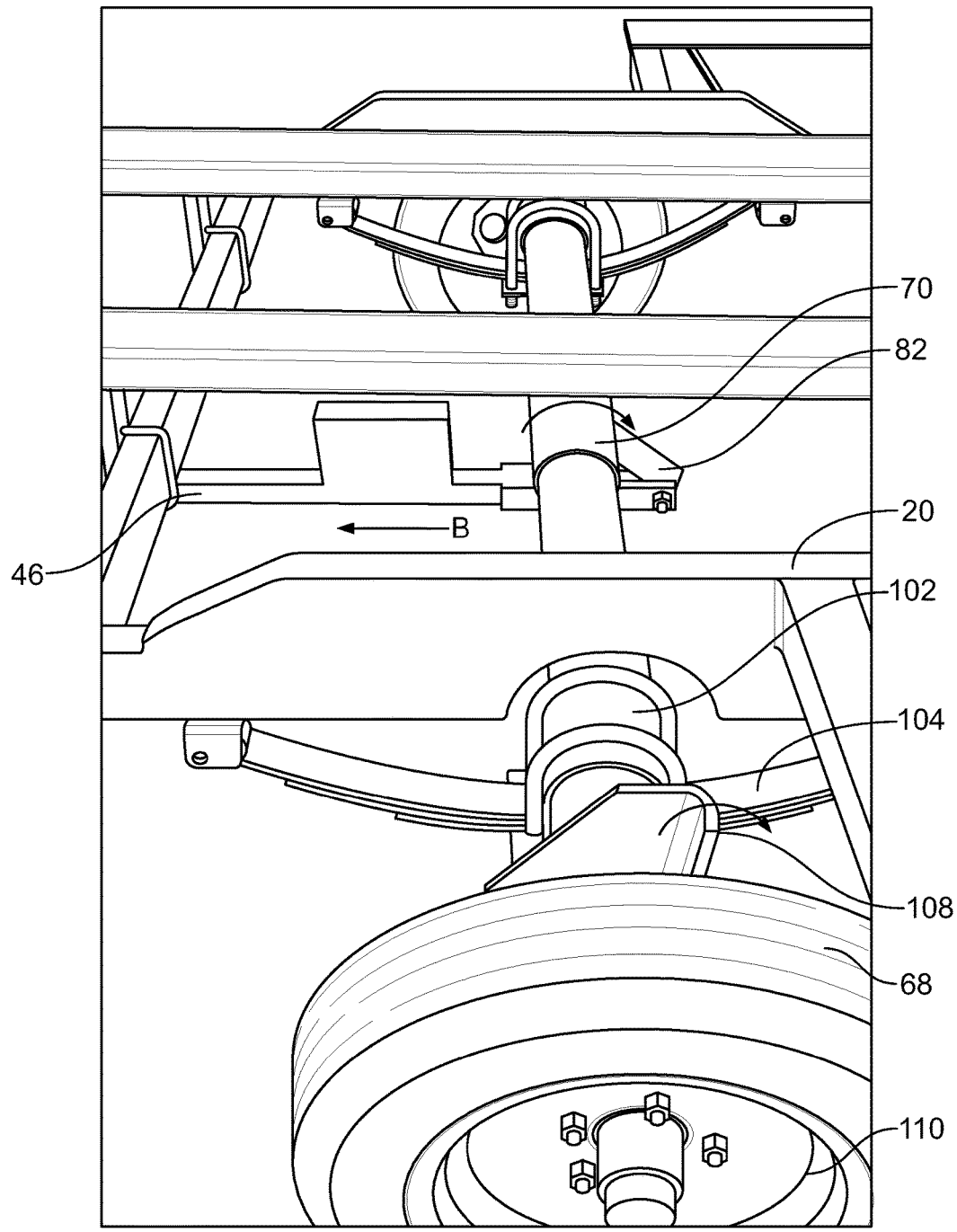
Figure 9B:
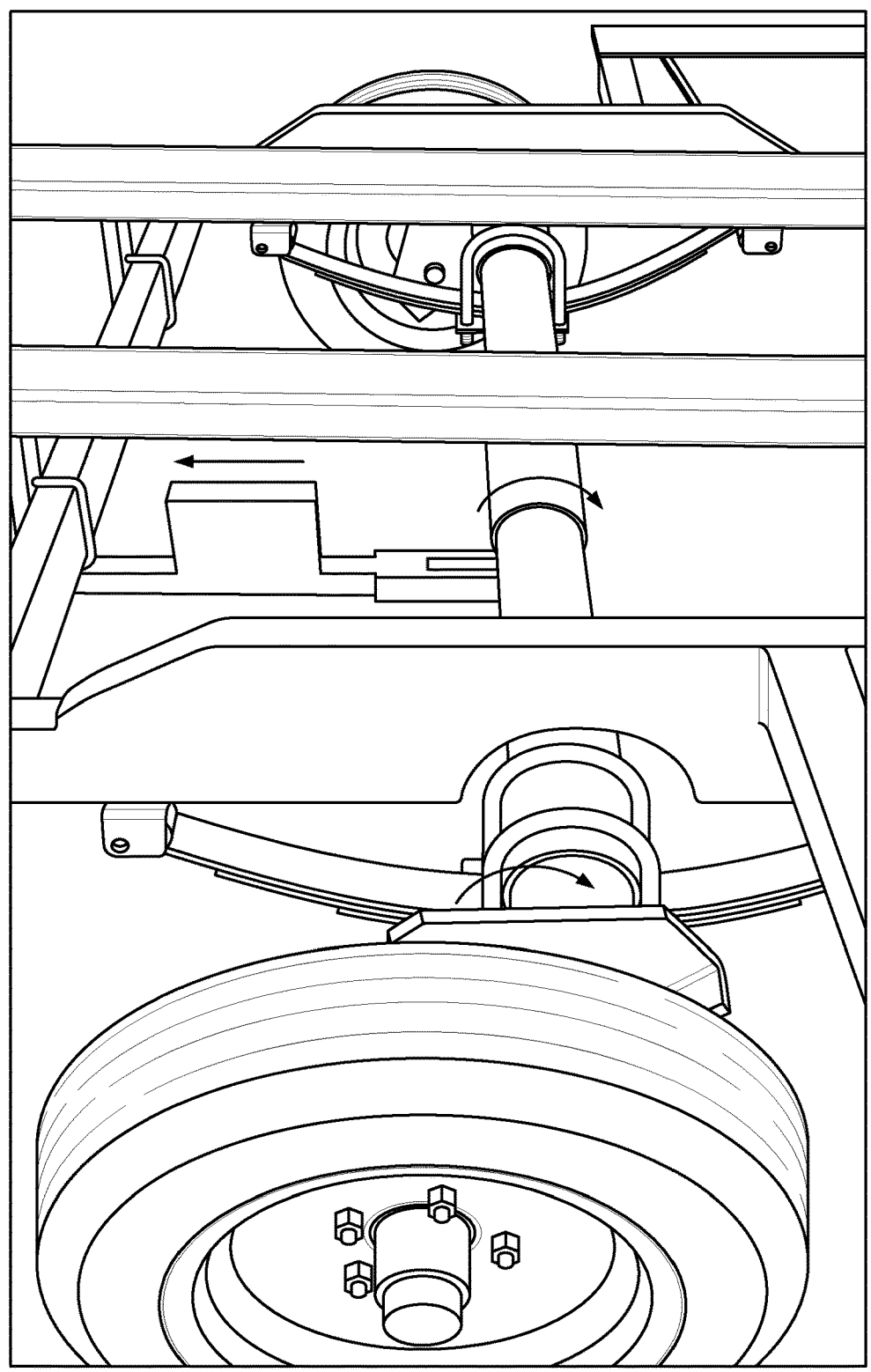
Figure 9C:
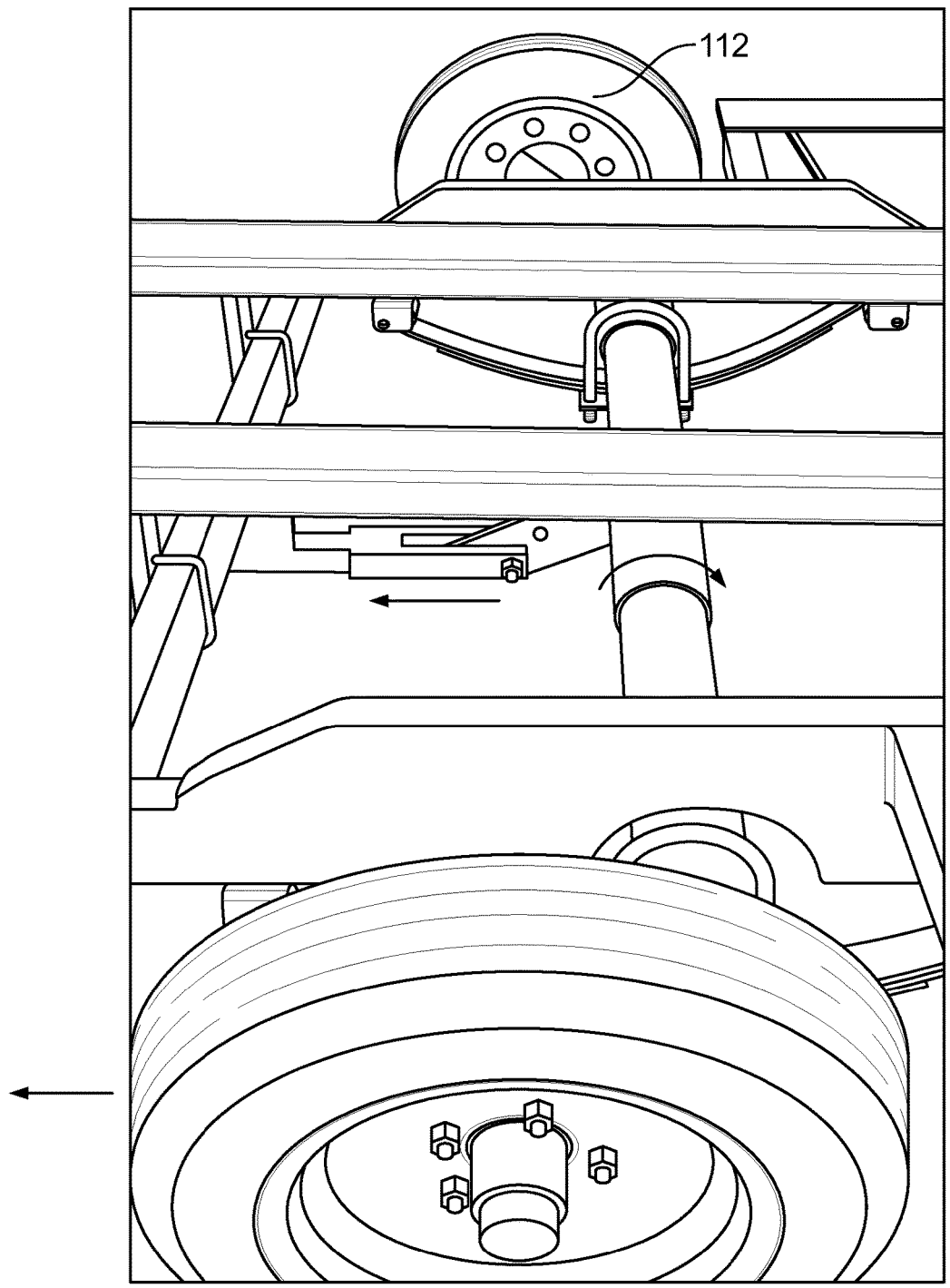

The method or process for lowering the rear or back end of the trailer 20 is illustrated in FIGS. 9a through 9c. Turning to FIG. 9a from the road transit or transport position, when the second elongated lever or rod 46 is moving in the forward direction or in the direction of Arrow B, as discussed above and illustrated in FIGS. 8a through 8e, this in turn pulls the flange 82 in the same direction of Arrow B. The tube 102 surrounds the rear axle 70 and is mechanically coupled to the spring suspension 104. As a result, the movement of the flange 82 and connection of the tube 102 to the extension 108, the extension 108 is rotated in the clockwise direction about the wheel hub 110 and thereby causes the wheel 68 to move forward in the direction of Arrow B. In this manner, during the rotation, the rear axle 70 situated inside the tube 102, equipped with grease zerk, is smoothly rotated inside. As the second elongated lever or rod 46 is continued to move in the forward direction or in the direction of Arrow B, and pulling the flange 82 in the same direction of Arrow B, the extension 108 is forced to continue to rotate in the clockwise direction about the wheel hub 110 and thereby cause the wheel 68 to move slightly more forward in the direction of Arrow B, as illustrated in FIG. 9b. In this manner, through the rotation of the extension 108 about the wheel hub 110 and changing the position of the extension 108 to a lower position in relation to the wheel hub 110, the tube 102 and rear axle 70 of the trailer 20 are lowered. This continues until the tube 102 and rear axle 70 are in their lowest position such that the trailer 20 reaches the lowered launching/loading position, as illustrated in FIG. 9c. This is also visible and shown by the exposed area 112 in the wheel hub 110.

Raising the Rear or Back End of the Trailer 20

Figure 9D:
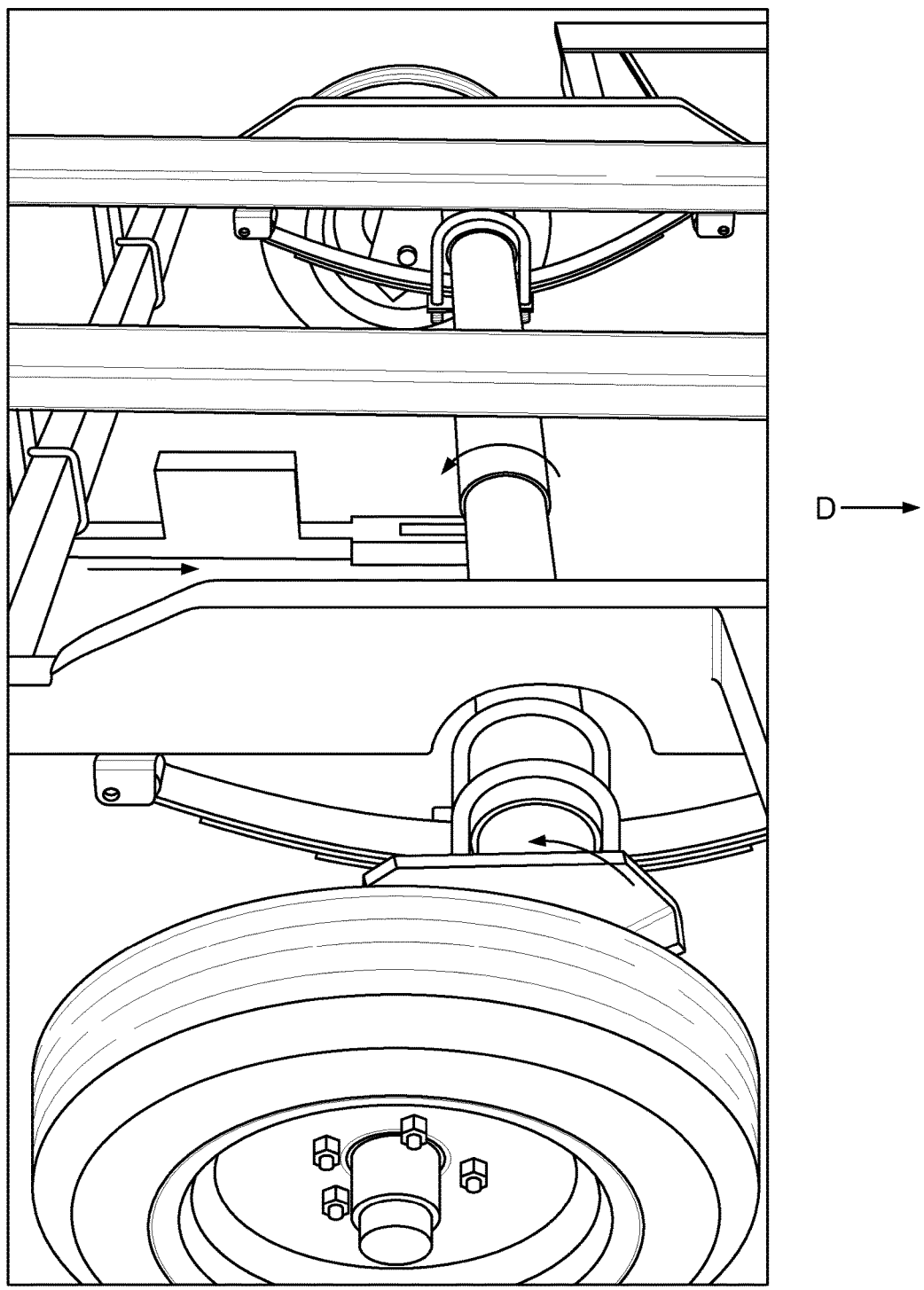
Figure 9E:
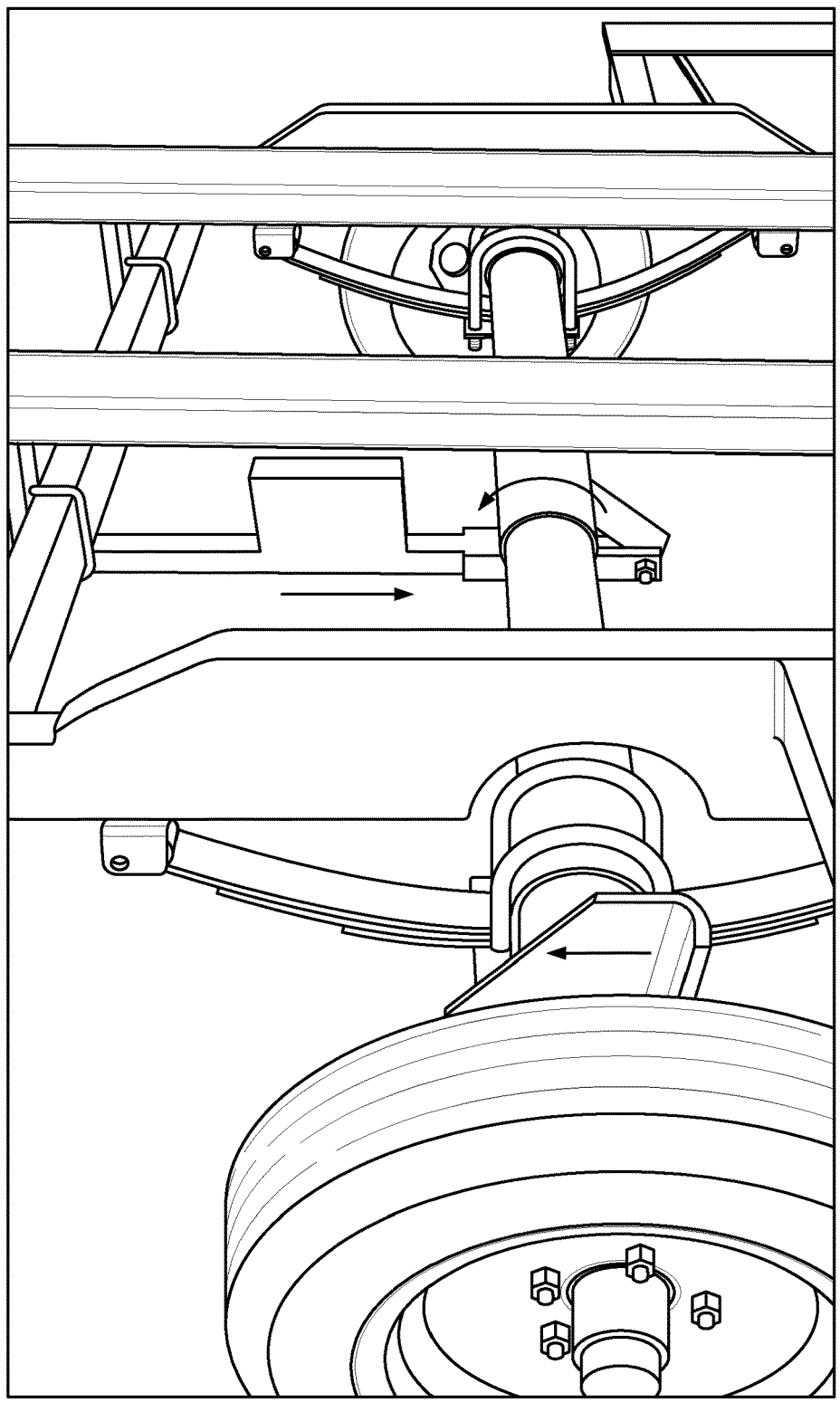

The method or process for raising the rear or back end of the trailer 20 is illustrated in FIGS. 9d through 9e. Turning to FIG. 9d from the lowered launching/loading position and reversing the process, when the second elongated lever or rod 46 is moving in the rearward or backward direction or in the direction of Arrow D, as discussed above and illustrated in FIGS. 8f through 8i, this in turn pushes the flange 82 in the same direction of Arrow D. With the tube 102 surrounding the rear axle 70 and mechanically coupled to the spring suspension 104 and connection to the extension 108, the extension 108 is rotated in the counter-clockwise direction about the wheel hub 110 and thereby causes the wheel 68 to move rearward or backward in the direction of Arrow D. In this manner, during the rotation, the rear axle 70 situated inside the tube 102 is smoothly rotated inside. As the second elongated lever or rod 46 is continued to move in the rearward or backward direction or in the direction of Arrow D, and pushing of the flange 82 in the same direction of Arrow D, the extension 108 is forced to continue to rotate in the counter-clockwise direction about the wheel hub 110 and thereby cause the wheel 68 to move slightly more rearward or backward in the direction of Arrow D, as illustrated in FIG. 9d. In this manner, through the rotation of the extension 108 about the wheel hub 110 and changing the position of the extension 108 to a higher position in relation to the wheel hub 110, the tube 102 and rear axle 70 of the trailer 20 are raised. This continues until the tube 102 and rear axle 70 are in their highest position such that the trailer 20 reaches the road transit or transport position, as illustrated in FIG. 9e.

Thus, the entire trailer 20 is lowered to its lowered launching/loading position to place the boat 100 or any other type of watercraft (collectively referred to herein as a "boat") in shallow water (such as 12", or any other height as desired by one of ordinary skill in the art) and then afterwards raised back to its original height or raised transport position (such as 36", or any other height as desired by one of ordinary skill in the art).

In addition to that described above, (1) one of the purposes of Applicant's invention is providing a simple means to be able to lower a boat or watercraft and be launched when the water level in the launch area is unfavorable for normal trailer launching; (2) the usefulness of Applicant's invention can also be very helpful as it can be lowered in a parking lot so that the sides of the boat are low enough to allow a handicap or semi handicapped person a way to be able to get in a boat on steady ground. Raise it back up and then launch. Reverse this procedure and the handicap person can get back out of the boat or watercraft in the parking area on steady ground close to a wheel chair or whatever assistance is needed; (3) the lowered boat or watercraft is also very useful for working inside it such as cleaning and maintenance of the interior; and (4) the trailer design is also very useful for first responders during flooding as it works very well for unloading in a street, alley or any road for rescue purposes.

Thus, there has been provided Applicant's unique method and apparatus for lowering an entire boat trailer in shallow water to launch a boat or any other type of watercraft and the likewise loading the boat or any other type of watercraft to return to its original position using the same means. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A trailer for launching a watercraft in shallow water, comprising:

the trailer having a front end and a rear end;

a tongue and an extension of tongue located at the front end of the trailer;

the extension of tongue hingedly affixed at one end to the tongue and secured at the other end;

an external front arm attached adjacent to the extension of tongue and providing an open slot;

a first elongated lever fixedly secured to the trailer;

means for securing the first elongated lever to the external front arm;

an actuating tube releaseably affixed to the first elongated lever;

a second elongated lever;

means for releaseably affixing the second elongated lever to the actuating tube;

a tube surrounding a rear axle located at the rear end of the trailer and having an extension at each opposed end, the extension at each opposed end fixedly secured to a wheel hub supporting a wheel;

means for securing the second elongated lever to the tube; and means for powering the actuating tube.

2. The trailer of claim 1 wherein the tongue and the extension of tongue are substantially in straight alignment when the trailer is in the raised transport position.

3. The trailer of claim 1 wherein a safety pin is positioned in a slot in the tongue to releaseably affix the tongue to the extension of tongue.

4. The trailer of claim 1 wherein the first elongated lever is aligned substantially parallel to the tongue.

5. The trailer of claim 1 wherein the second elongated lever is aligned substantially parallel to the tongue.

6. The trailer of claim 1 wherein the external front arm is received in the channel and positioned in substantial straight alignment with the first elongated lever when the trailer is in the raised transport position.

7. The trailer of claim 1 wherein the means for securing the first elongated lever to the external front arm comprises the first elongated lever providing a channel at one end terminating in an actuating member with the actuating member being received through the open slot of the external front arm.

8. The trailer of claim 1 wherein the means for releaseably affixing the second elongated lever to the actuating tube comprises a second arm having a proximal end and a distal end, the proximal end of the second arm hingedly secured to the actuating tube, and the distal end of the second arm hingedly secured to the second elongated lever.

9. The trailer of claim 1 wherein upon retracting the actuating tube forces the first elongated lever to move in the direction toward the rear end of the trailer and forces the second elongated lever to move in the direction toward the front end of the trailer.

10. The trailer of claim 9 wherein, upon retracting the actuating, tube and forcing the first elongated lever to move in the direction toward the rear end of the trailer, the tongue and extension of tongue are transformed into a bent alignment to lower the front end of the trailer into the lowered launching position, the extension of tongue rotating downwardly toward the ground in relation to both the one end in relation to the tongue and at the other secured end.

11. The trailer of claim 9 wherein, upon retracting the actuating tube and forcing, the second elongated lever to move in the direction toward the front end of the trailer, the extension is rotated about the wheel hub to lower the rear end of the trailer into the lowered launching position.

12. The trailer of claim 1 wherein upon extending the actuating tube forces the first elongated lever to move in the direction toward the front end of the trailer and forces the second elongated lever to move in the direction toward the rear end of the trailer.

13. The trailer of claim 12 wherein, upon extending the actuating tube and forcing the first elongated lever to move in the direction toward the front end of the trailer, the tongue and extension of tongue are transformed back into substantial straight alignment to raise the front end of the trailer back into the raised transport position, the extension of tongue rotating upwardly away from the ground at both the one end in relation to the tongue and at the other secured end.

14. The trailer of claim 12 wherein, upon extending the actuating tube and forcing the second elongated lever to move in the direction toward the rear end of the trailer, the extension is counter-rotated about the wheel hub to raise the rear end of the trailer into the raised transport position.

15. The trailer of claim 1 wherein the means for powering the actuating tube is selected from the group consisting of a hydraulic cylinder and an electric trailer tongue jack, each activated by a mechanical switch to force the actuating tube to extend or retract.

16. A trailer for launching a watercraft in shallow water, comprising:

the trailer having a front end and a rear end;
a tongue and an extension of tongue located at the front end of the trailer;
the extension of tongue hingedly affixed at one end to the tongue and mounted at the other end to a tow hitch, the extension of tongue providing an open slot;
a first elongated lever fixedly secured to the trailer and providing a channel at one end terminating in an actuating member;
means for securing the first elongated lever to the extension of tongue;
an actuating tube releaseably affixed to the first elongated lever;
a second elongated lever;
means for releaseably affixing the second elongated lever to the actuating tube;
a tube located at the rear end of the trailer and having an extension at each opposed end, the extension at each opposed end fixedly secured to a hub supporting a wheel;
means for securing the second elongated lever to the tube; and
means for powering the actuating tube.

\* \* \* \* \*